US011970192B2

(12) United States Patent
Smith

(10) Patent No.: US 11,970,192 B2
(45) Date of Patent: Apr. 30, 2024

(54) RAILROAD ENERGY DELIVERY SYSTEM

(71) Applicant: SunTrain, Inc., San Francisco, CA (US)

(72) Inventor: Christopher Douglas Smith, San Francisco, CA (US)

(73) Assignee: SunTrain, Inc., San Francisco, CA (US)

( * ) Notice: Subject to any disclaimer, the term of this patent is extended or adjusted under 35 U.S.C. 154(b) by 0 days.

(21) Appl. No.: 17/937,350

(22) Filed: Sep. 30, 2022

(65) Prior Publication Data
US 2023/0106707 A1    Apr. 6, 2023

Related U.S. Application Data

(60) Provisional application No. 63/252,055, filed on Oct. 4, 2021.

(51) Int. Cl.
*B61C 3/02* (2006.01)
*B25J 18/02* (2006.01)
(Continued)

(52) U.S. Cl.
CPC ............... *B61C 3/02* (2013.01); *B25J 18/02* (2013.01); *B60L 5/18* (2013.01); *B61D 3/06* (2013.01);
(Continued)

(58) Field of Classification Search
CPC .... B61C 3/02; B25J 18/02; B60L 5/18; B60L 55/00; B60L 2200/26; B60L 50/66;
(Continued)

(56) References Cited

U.S. PATENT DOCUMENTS 4,795,859 A * 1/1989 Kato ................... B60L 1/04
191/11
6,026,349 A   2/2000 Heneman
(Continued)

FOREIGN PATENT DOCUMENTS

KR    10-2019-0050439 A    5/2019

OTHER PUBLICATIONS

International Search Report and Written Opinion mailed Jan. 4, 2023, directed to International Application No. PCT/US2022/077436; 14 pages.
(Continued)

*Primary Examiner* — Hai H Huynh
(74) *Attorney, Agent, or Firm* — Morrison & Foerster LLP

(57) ABSTRACT

Provided herein is an energy delivery system for transporting electrical energy from an electrical energy generation facility to an electrical energy consumption facility via rail. The energy delivery system can comprise a train comprising at least one rail car loaded with at least one battery system. The battery system can comprise an energy transfer interface for receiving energy from the energy generation facility when the train is located at the energy generation facility for charging batteries of the battery system and for transferring energy stored by the battery system to the energy consumption facility when the train is located at the energy consumption facility. The energy transfer interface can be configured to receive energy from a corresponding energy transfer interface mounted to a crane system of the energy generation facility and to transfer energy to a corresponding energy transfer interface mounted to a crane system of the energy consumption facility.

35 Claims, 9 Drawing Sheets

(51) Int. Cl.

| | |
|---|---|
| *B60L 5/18* | (2006.01) |
| *B61D 3/06* | (2006.01) |
| *B61L 27/10* | (2022.01) |
| *H01M 10/44* | (2006.01) |
| *H01M 50/204* | (2021.01) |
| *H01M 50/249* | (2021.01) |
| *H01M 50/258* | (2021.01) |
| *H02J 3/32* | (2006.01) |
| *H02J 7/00* | (2006.01) |
| *H02J 7/34* | (2006.01) |
| *H02J 50/10* | (2016.01) |
| *H02J 50/40* | (2016.01) |
| *H02J 50/90* | (2016.01) |
| *B60L 55/00* | (2019.01) |
| *B60M 1/00* | (2006.01) |
| *B60M 5/00* | (2006.01) |

(52) U.S. Cl.
CPC ........... *B61L 27/10* (2022.01); *H01M 10/441* (2013.01); *H01M 50/204* (2021.01); *H01M 50/249* (2021.01); *H01M 50/258* (2021.01); *H02J 3/32* (2013.01); *H02J 7/0013* (2013.01); *H02J 7/0042* (2013.01); *H02J 7/342* (2020.01); *H02J 50/10* (2016.02); *H02J 50/40* (2016.02); *H02J 50/90* (2016.02); *B60L 55/00* (2019.02); *B60L 2200/26* (2013.01); *B60M 1/00* (2013.01); *B60M 5/00* (2013.01); *H01M 2220/20* (2013.01)

(58) Field of Classification Search
CPC .......... B60L 53/12; B60L 53/14; B60L 53/37; B60L 53/38; B61D 3/16; B61L 27/10; H01M 10/441; H01M 50/204; H01M 50/249; H01M 50/258; H01M 2220/20; H02J 3/32; H02J 7/0013; H02J 7/0042; H02J 7/342; H02J 50/10; H02J 50/40; H02J 50/90; B60M 1/00; B60M 5/00; Y02T 10/70; Y02T 10/7072
USPC ............................................... 701/19, 22, 25
See application file for complete search history.

(56) References Cited

U.S. PATENT DOCUMENTS

| | | | |
|---|---|---|---|
| 6,087,739 A * | 7/2000 | Jalliffier | B61G 5/10 191/4 |
| 6,649,289 B2 | 11/2003 | Hsu et al. | |
| 6,653,749 B2 | 11/2003 | Delbridge | |
| 6,900,556 B2 | 5/2005 | Provanzana et al. | |
| 7,566,980 B2 | 7/2009 | Fein et al. | |
| 7,737,571 B2 | 6/2010 | Fein et al. | |
| 7,893,552 B2 | 2/2011 | Fein et al. | |
| 8,299,645 B2 | 10/2012 | Muchow et al. | |
| 8,791,589 B2 | 7/2014 | Colello et al. | |
| 8,866,334 B2 | 10/2014 | Donnelly et al. | |
| 8,879,242 B2 | 11/2014 | Prax et al. | |
| 9,054,559 B2 | 6/2015 | Marks De Chabris | |
| 9,142,969 B2 | 9/2015 | Stiesdal et al. | |
| 9,422,922 B2 | 8/2016 | Sant'Anselmo et al. | |
| 9,787,097 B2 | 10/2017 | Chattot et al. | |
| 9,979,202 B2 | 5/2018 | Sudan et al. | |
| 10,079,524 B1 | 9/2018 | Polanich | |
| 10,345,050 B2 | 7/2019 | Pietsch et al. | |
| 10,790,525 B2 | 9/2020 | Zietlow | |
| 10,852,037 B2 | 12/2020 | Sant'Anselmo et al. | |
| 10,909,641 B2 | 2/2021 | Macklis et al. | |
| 11,034,261 B2 * | 6/2021 | Landreth | B60L 5/18 |
| 2005/0279242 A1 * | 12/2005 | Maier | B60L 50/30 105/26.05 |
| 2006/0005739 A1 | 1/2006 | Kumar | |
| 2006/0180364 A1 | 8/2006 | Wobben | |
| 2010/0201309 A1 | 8/2010 | Meek | |
| 2011/0215640 A1 | 9/2011 | Donnelly et al. | |
| 2012/0313585 A1 | 12/2012 | Pereira | |
| 2013/0033230 A1 | 2/2013 | Falk et al. | |
| 2013/0317674 A1 * | 11/2013 | Arai | B61C 17/12 701/19 |
| 2014/0368044 A1 | 12/2014 | Jensen | |
| 2016/0006249 A1 | 1/2016 | Sala et al. | |
| 2016/0036097 A1 | 2/2016 | Lopes De Sousa Silva et al. | |
| 2016/0285412 A1 | 9/2016 | French | |
| 2019/0152344 A1 | 5/2019 | Landreth | |
| 2019/0312296 A1 | 10/2019 | Rousselle, Sr. et al. | |
| 2021/0028628 A1 | 1/2021 | Voller | |
| 2023/0103923 A1 * | 4/2023 | Smith | H01M 50/249 105/50 |
| 2023/0105841 A1 * | 4/2023 | Smith | H01M 50/204 307/21 |
| 2023/0106281 A1 * | 4/2023 | Smith | B61C 3/02 105/50 |
| 2023/0106707 A1 * | 4/2023 | Smith | H01M 50/258 701/19 |
| 2023/0109536 A1 * | 4/2023 | Smith | H01M 50/204 105/50 |

OTHER PUBLICATIONS

Julin. (Nov. 23, 2021) "Big Batteries on Wheels Can Deliver Zero-Emissions Rail While Securing the Grid," located at https://newscenter.lbl.gov/2021/11/23/big-batteries-on-wheels-can-deliver-zero-emissions-rail-while-securing-the-grid/. (4 pages).

Popovich et al. (Nov. 2021). "Economic, environmental and grid-resilience benefits of converting diesel trains to battery-electric," Nature Energy 6: 1017-1025.

Smith, U.S. Office Action mailed Jul. 17, 2023, directed to U.S. Appl. No. 17/937,322; 9 pages.

* cited by examiner

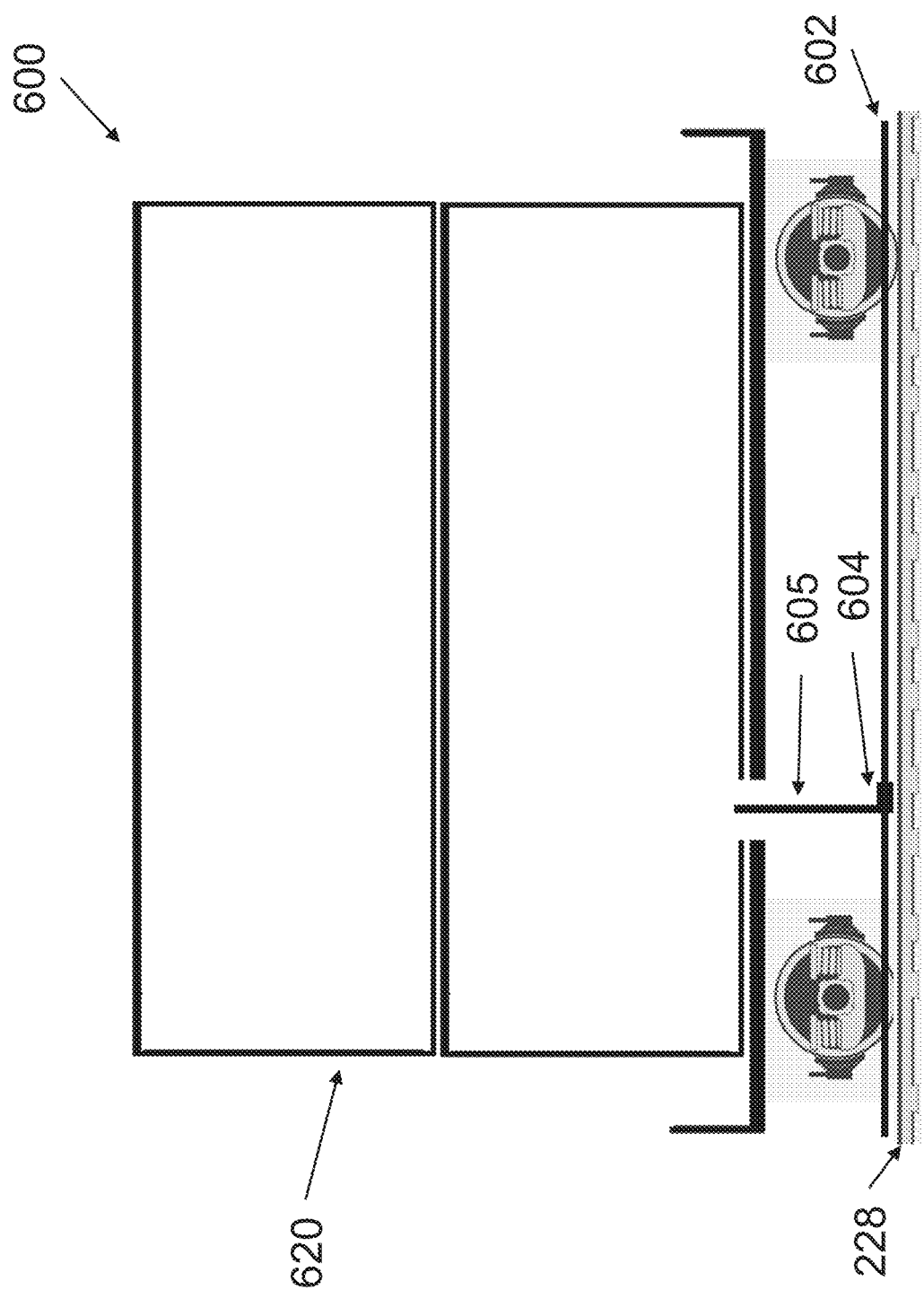

RAILROAD ENERGY DELIVERY SYSTEM

CROSS REFERENCE TO RELATED APPLICATIONS

This application claims the benefit of U.S. Provisional Application No. 63/252,055, filed on Oct. 4, 2021, the entire contents of which are incorporated herein by reference.

FIELD OF THE DISCLOSURE

The present disclosure relates generally to an energy delivery system, and more specifically to an energy delivery system for delivering electrical energy from an energy generation facility to an energy consumption facility via rail cars of a train.

BACKGROUND OF THE DISCLOSURE

Additional energy generation sources are required to meet the increased demand for energy. As many newer energy generation facilities are generally located in remote areas, it is necessary to transport energy from those remote areas to more densely populated areas in need of energy. One method of transporting this energy is to run electrical lines to an electrical grid, but this presents various issues. For example, the majority of the United States electrical grid was built more than 30 years ago, and has received only incremental investment since. Connecting new energy generation facilities to the existing electrical grid also requires navigating a bureaucratic interconnection process and often a decade of time to obtain permits to construct new electrical transmission lines and supporting electrical infrastructure.

In current energy generation facilities, energy is generated and nearly instantaneously transmitted to an electrical grid to be consumed by customers. When excess energy is generated, it flows to either energy storage receptacles or to the electrical grid. When not enough storage receptacles are available, the excess energy that flows to the electrical grid can damage the electrical grid. One solution is to construct more energy storage facilities. However, new storage facilities cannot easily be constructed in populated regions, where energy is needed, as energy storage facilities require significant space and would render nearby areas undesirable. Moreover, constructing new energy storage facilities similarly requires following the protracted and complex permitting processes described above.

Accordingly, there exists a need for systems that can receive excess energy from existing energy generation facilities and transport that energy to other locations in need of energy, and for receiving energy from new energy generation facilities without constructing new electrical infrastructure.

SUMMARY OF THE DISCLOSURE

Described herein are systems and methods for delivering energy from an energy generation facility to an energy consumption facility that is remote from the energy generation facility via train. Batteries on rail cars of a train can be charged at the energy generation facility and then the train with its charged batteries can move via rail to the energy consumption facility for supplying energy to the energy consumption facility. The rail cars can be configured for quick and easy charging and discharging of the batteries without the batteries having to be moved off the rail cars, via such methods as a wireless energy transfer system, pantograph, third rail, crane system, or a retractable arm system.

According to some embodiments, an energy delivery system can utilize shipping containers outfitted with the batteries and related electrical equipment for charging, discharging, and storing energy that can easily be mounted to well cars and transported via a train utilizing existing railroad tracks that already extend from remote areas to populated areas. Accordingly, the energy delivery system can avoid the protracted permitting processes and huge capital investment associated with constructing new electrical infrastructure. The energy delivery systems can mitigate issues with using the existing electrical grid or overloading electrical transmission lines by transporting energy to where it is needed. Moreover, by utilizing shipping containers for storing energy, which can be stacked to take up a relatively small footprint, the energy delivery system requires little space and could be parked in a variety of locations such as empty parking areas, vacant lots, gravel fields, etc. that are in close proximity to facilities requiring energy.

In one or more examples, an energy delivery system for transporting electrical energy from an electrical energy generation facility to an electrical energy consumption facility via rail can comprise: a train comprising at least one rail car loaded with at least one battery system, the at least one battery system comprising at least one energy transfer interface for receiving energy from an energy generation facility when the train is located at the energy generation facility for charging batteries of the at least one battery system and for transferring energy stored by the at least one battery system to the energy consumption facility when the train is located at the energy consumption facility, wherein the energy transfer interface is configured to receive energy from a corresponding energy transfer interface mounted to a crane system of the energy generation facility and to transmit energy to a corresponding energy transfer interface mounted to a crane system of the energy consumption facility.

The crane system of the energy generation facility can comprise one or more sensors and a controller configured to receive information from the one or more sensors corresponding to a position of the energy transfer interface of the at least one rail car, and align the energy transfer interface of the energy generation facility with the energy transfer interface of the at least one rail car via the crane system based on the received information. In one or more examples, the controller can be configured to move the energy transfer interface of the energy generation facility vertically to align with the energy transfer interface of the at least one rail car. The controller can be configured to move the energy transfer interface of the energy generation facility horizontally to align with the energy transfer interface of the at least one rail car. The controller can be configured to locate the energy transfer interface of a second rail car via the one or more sensors, and align the energy transfer interface of the energy generation facility with the energy transfer interface of the second rail car via the crane system.

In one or more examples, the energy transfer interface of the at least one rail car can be configured to receive energy from the corresponding energy transfer interface of the energy generation facility in a contactless manner. Optionally, the energy transfer interface of the at least one rail car includes at least one inductive coil. The inductive coil can be positioned to inductively couple with an inductive coil of the corresponding energy transfer interface of the energy generation facility to transfer energy in a contactless manner.

In one or more examples, the energy transfer interface of the at least one rail car can be configured to receive energy upon contacting the corresponding energy transfer interface of the energy generation facility. Optionally, the energy transfer interface of the at least one rail car can include a contact shoe. The contact shoe can be positioned to contact a contact plate of the corresponding energy transfer interface of the energy generation facility to transfer energy.

In one or more examples, at least one rail car of the train comprises a well car loaded with one or more intermodal containers that house the batteries. The at least one well car can comprise a first intermodal container stacked on top of a second intermodal container. A battery system of a first rail car can be electrically connected to a battery system of a second rail car such that energy can be transmitted between the two rail cars. Optionally, the first rail car does not have an energy transfer interface. In one or more of the rail cars can comprise a controller that controls energy flow to and/or from the rail car.

In one or more examples, a method for transporting electrical energy from an electrical energy generation facility to an electrical energy consumption facility via rail can comprise: positioning a train comprising at least one rail car loaded with at least one battery system and at least one energy transfer interface proximate to an energy generation facility, aligning an energy transfer interface of the energy generation facility with the energy transfer interface of at least one rail car via a crane system of the energy generation facility, charging batteries of the at least one battery system with energy transferred from the energy generation facility to the at least one battery system via the energy transfer interfaces, relocating the train via one or more rail lines to an energy consumption facility that is remote from the energy generation facility, aligning an energy transfer interface of the energy consumption facility with the energy transfer interface of the at least one rail car via a crane system of the energy consumption facility, and transferring energy from the batteries of the at least one battery system to the energy consumption facility via the energy transfer interfaces.

Aligning the energy transfer interface of the energy generation facility with the energy transfer interface of the at least one rail car can comprise: receiving information from one or more sensors of the crane system of the energy generation facility corresponding to a position of the energy transfer interface of the at least one rail car, and aligning the energy transfer interface of the energy generation facility with the energy transfer interface of the at least one rail car via a controller of the crane system based on the received information. Aligning the energy transfer interface of the energy generation facility with the energy transfer interface of the at least one rail can comprise: moving the energy transfer interface of the energy generation facility vertically via the controller of the crane system. Aligning the energy transfer interface of the energy generation facility with the energy transfer interface of the at least one rail can comprises moving the energy transfer interface of the energy generation facility horizontally via the controller of the crane system.

In one or more examples, the method can comprise locating the energy transfer interface of a second rail car via the one or more sensors of the crane system of the energy generation facility, and aligning the energy transfer interface of the energy generation facility with the energy transfer interface of the second rail car via the controller of the crane system. Optionally, the energy transfer interface of the at least one rail car is configured receive energy from the corresponding energy transfer interface of the energy generation facility in a contactless manner. Optionally, the energy transfer interface of the at least one rail car includes at least one inductive coil.

Aligning the energy transfer interface of the energy generation facility with the energy transfer interface of at least one rail car can comprise positioning the inductive coil of the at least one rail car to inductively couple with an inductive coil of the corresponding energy transfer interface of the energy generation facility to transfer energy in a contactless manner. In one or more examples, aligning the energy transfer interface of the energy generation facility with the energy transfer interface of at least one rail car can comprise positioning the inductive coil of the at least one rail car within a predefined distance from the inductive coil of the corresponding energy transfer interface of the energy generation facility. The predefined distance can be 5 mm, 20 mm, 100 mm, 300 mm, or 500 mm.

In one or more examples, the energy transfer interface of the at least one rail car can be configured to receive energy upon contacting the corresponding energy transfer interface of the energy generation facility. The energy transfer interface of the at least one rail car can include a contact shoe. Aligning the energy transfer interface of the energy generation facility with the energy transfer interface of at least one rail car can comprise positioning the contact of the at least one rail car to contact a contact plate of the corresponding energy transfer interface of the energy generation facility to transfer energy.

In one or more examples, the method comprises relocating the train at the energy generation facility after the batteries have been at least partially discharged. Optionally, a first battery system of a first rail car can comprise the energy transfer interface and is electrically connected to a second battery system of a second rail car that does not have an energy transfer interface. In one or more examples, at least one rail car of the train comprises a well car loaded with one or more intermodal containers that house the batteries. The at least one well car can comprise a first intermodal container stacked on top of a second intermodal container.

In one or more examples, the train can be moved via one or more locomotives that are powered independently of energy stored by the at least one battery system. Optionally, the train can be moved via one or more locomotives that are powered via energy stored by the at least one battery system.

It will be appreciated that any of the variations, aspects, features, and options described in view of the systems apply equally to the methods and vice versa. It will also be clear that any one or more of the above variations, aspects, features, and options can be combined.

BRIEF DESCRIPTION OF THE FIGURES

The invention will now be described, by way of example only, with reference to the accompanying drawings, in which:

FIG. 6A shows an exemplary third rail system, according to one or more examples of the present disclosure;

DETAILED DESCRIPTION OF THE DISCLOSURE

Figure 1:
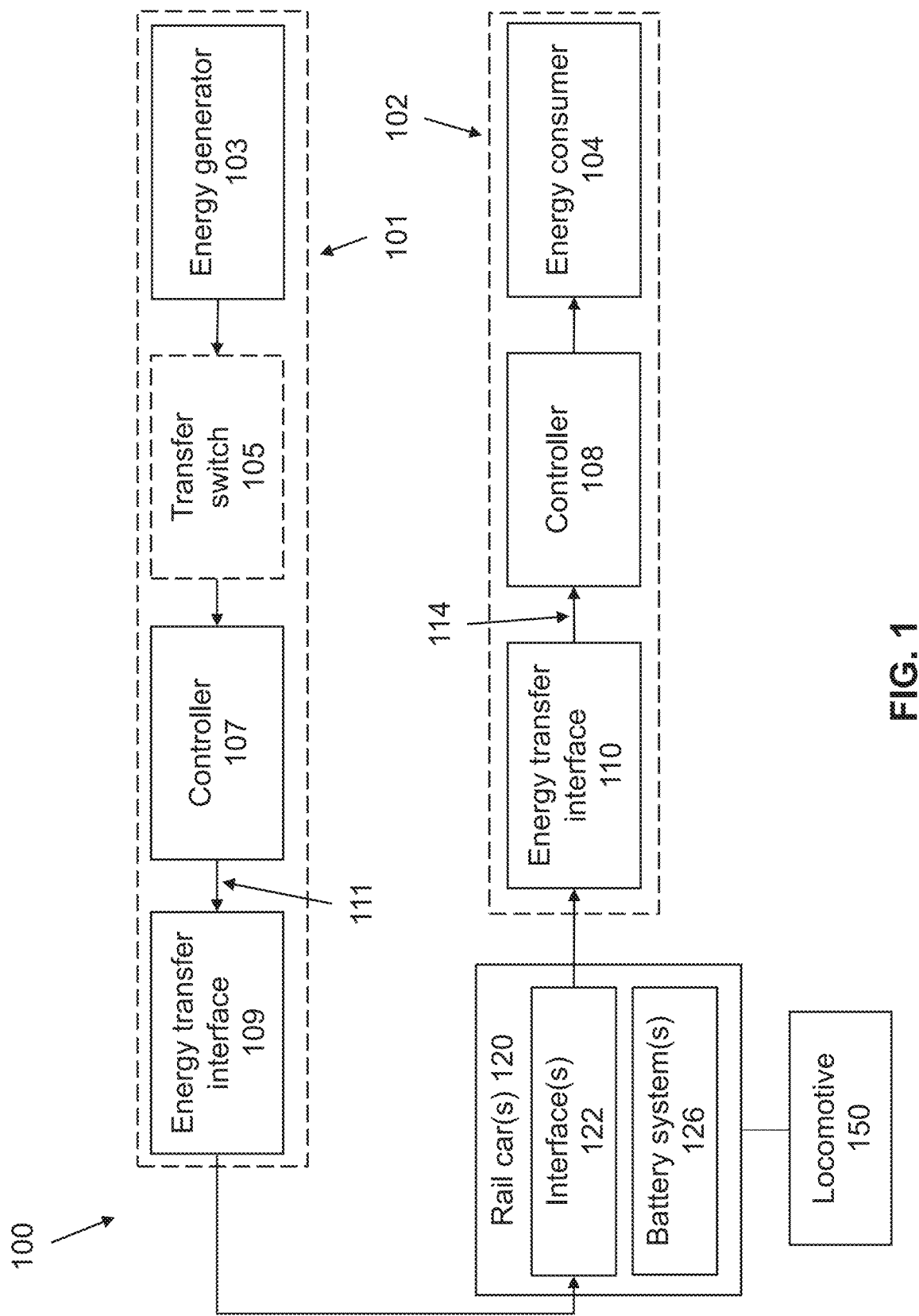
FIG. 1 shows an exemplary energy delivery system, according to one or more examples of the present disclosure.

In the following description of the various examples, reference is made to the accompanying drawings, in which are shown, by way of illustration, specific examples that can be practiced. The description is presented to enable one of ordinary skill in the art to make and use the invention and is provided in the context of a patent application and its requirements. Various modifications to the described examples will be readily apparent to those persons skilled in the art and the generic principles herein may be applied to other examples. Thus, the present invention is not intended to be limited to the examples shown but is to be accorded the widest scope consistent with the principles and features described herein.

Described herein are systems and methods for delivering energy from an energy generation facility to an energy consumer (often referred to herein as an energy consumption facility) that is remote from the energy generation facility via train. One or more rail cars of a train can be loaded with one or more battery systems comprising batteries that can be charged at an energy generation facility and discharged at an energy consumer and pulled by a train locomotive between the two. The energy generation facility, energy consumer, and battery systems include corresponding components of an energy transfer system for transferring energy between the battery systems loaded on the rail car(s) and the energy generation/consumption facilities. The energy transfer system can be configured to automatically interface the battery systems with the facilities without requiring manual connection.

One or more of the rail car-based battery systems include an energy transfer interface for receiving energy from the energy generation facility and transferring energy to the energy consumer. The energy generation facility includes a corresponding energy transfer interface for transferring energy to the interface of the rail car, and the energy consumption facility also includes a corresponding energy transfer interface for receiving energy from the battery system(s) of the rail car(s). Various types of energy transfer interfaces can be used, including contactless interfaces, pantograph interfaces, third rail interfaces, contact shoe/ contact plate interfaces, etc.

According to some embodiments, the energy transfer system is a wireless energy transfer system for transferring energy wirelessly between the battery system(s) and the energy generation/consumption facilities. A wireless energy interface can include inductive coils for transferring energy. The battery system(s), energy generation facility, and energy consumer can each include inductive energy transfer interfaces for inductively transferring energy between the interfaces.

According to some embodiments, the energy transfer system comprises a pantograph system. The battery system includes a pantograph configured to contact conductive wiring suspended over the tracks at the energy generation facility and energy consumer. When the train pulls the rail cars into the energy generation facility and the energy consumer, the pantograph(s) of the battery system(s) can automatically engage the wiring for transferring energy to or from the battery system.

In some embodiments, the energy transfer system comprises a third rail system. One or more of the battery systems include a contactor that contacts a third rail of the tracks to transfer energy from/to the energy generation/consumption facility via the third rail.

In some embodiments, the energy transfer system comprises a crane system. The crane system can include sensors to sense the location of energy transfer interfaces of rail cars of the train and a controller to align a corresponding energy transfer system of the energy generation facility (or energy consumption facility) with the energy transfer interfaces of the rail cars to charge/discharge the batteries of the rail cars. The crane system can be configured to align a variety of energy transfer interfaces, such as a contactless or a contact interface system.

In some embodiments, the energy transfer system comprises a retractable arm system. The retractable arm system can include sensors to sense the location of energy transfer interfaces of rail cars of the train and a controller to align a corresponding energy transfer system of the energy generation facility (or energy consumption facility) with the energy transfer interfaces of the rail cars to charge/discharge the batteries of the rail cars. The retractable arm system can be configured to align a variety of energy transfer interfaces, such as a contactless or a contact interface system.

According to various embodiments, a train pulling one or more rail cars loaded with one or more battery systems pulls into an energy generation facility and positions the rail cars such that the energy transfer interface(s) of the one or more battery systems is aligned with the energy transfer interface(s) of the energy generation facility. Optionally, sensors and a controller can be utilized to align the energy transfer interface(s) of the energy generation facility with the energy transfer interface(s) of the one or more battery systems. Energy from the energy generation facility is then transferred to the batteries of the one or more battery systems. After the batteries are sufficiently charged, the train is driven along via railroad tracks to an energy consumption facility that is remote from the energy generation facility. The train pulls the rail car(s) into a position such that the energy transfer interface(s) of the one or more battery systems is aligned with the energy transfer interface(s) of the energy consumption facility. Energy can then transfer to the energy consumption facility as needed. When the batteries have been depleted, the rail cars can be returned to an energy generation facility for recharging. In some embodiments, a different set of railcars having charged batteries can be pulled into the energy consumption facility to continue to supply energy to the facility.

As used herein, the singular forms "a," "an," and "the" used in the following description are intended to include the plural forms as well unless the context clearly indicates otherwise. It is to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

FIG. 1 shows an exemplary energy delivery system 100, according to one or more examples of the present disclosure. The energy delivery system 100 can include an energy generation system 101, an energy consumption system 102 located remotely from the energy generation system 101, and a train comprising one or more rail cars 120 that have battery systems 126 for storing energy. In one or more examples, the one or more rail cars 120 can be connected to one another and connected to one or more locomotives 150 for moving the one or more rail cars 120 between the energy generation system 101 to the energy consumption system 102 via railroad tracks. Thus, energy can be delivered to remotely located energy consumers without requiring interconnection by an energy grid. In some embodiments, the one or more locomotives that move the rail cars are independently energized (i.e., not energized by the energy stored by the battery systems). In some embodiments, energy from the battery systems at least partially powers one or more locomotives that pull the rail cars.

The energy generation system 101 can include one or more energy generators 103, a controller 107, and one or more energy transfer interfaces 109. As shown in FIG. 1, arrows 111 connect the energy generators 103 to the transfer switch 105, controller 107, and the energy transfer interface 109. These arrows 111 can represent electrical conductors or electrical transmission lines to convey electrical energy. When the energy generation system 101 does not include the transfer switch 105, the energy generators 103 can be connected to the controller 107 directly. In one or more examples, electrical energy flows as indicated by the arrows 111 from the energy generators 103 to the controller 107 (or first to the transfer switch 105 and then to the controller 107 if the transfer switch 105 is present) and then to the energy transfer interface 109.

In one or more examples, the energy generation system 101 is isolated from a utility grid system or other local electrical load. For example, the energy generation system 101 can be configured only to generate electricity to be transported to an energy consumption facility that is remote from the energy generation system 101 via a mobile transport system such as the rail car(s) 120.

Alternatively, the energy generation system 101 can be electrically connected to a utility grid or other local electrical load. For instance, the electrical generation system 101 can be configured to provide energy to an existing electrical utility grid. To divert this electricity to the rail car(s) 120, the electrical generation system 101 can incorporate a transfer switch 105. The transfer switch 105 can selectively route the energy generated via the energy generators 103 to the rail car(s) 120 of a train. For example, the transfer switch 105 can route 100% of the energy to the rail cars 120. In one or more examples, the transfer switch 105 routes less than 100% of the energy to the rail cars 120. For instance, the transfer switch 105 can route less than 80%, less than 50%, or less than 30% of the energy to the rail cars 120. Optionally, the transfer switch 105 may only route energy to rail cars 120 during certain periods.

The energy generator 103 can include any type of energy generator capable of generating electrical energy. For instance, the energy generators 103 can include intermittent renewable energy generation facilities such as photovoltaic solar array farms, solar thermal facilities, wind turbine farms, etc., that intermittently generate electricity, such as only when there are solar arrays or wind to utilize. The energy generators 103 can include other renewable energy generation facilities such as hydroelectric dams, geothermal plants, organic bioenergy/biomass generation facilities, utility scale battery energy storage farms, nuclear energy facilities, etc. The energy generators 103 can include coal or gasoline-based energy generation facilities. In one or more examples, the energy generator 103 can include a utility substation or large utility electrical service drop. Optionally, when the energy generator 103 includes one or more of a utility substation and a large utility electrical service drop, the energy generators 103 can be used to charge batteries of the rail cars 120 only during hours when energy is less expensive and more widely available from renewable green energy sources such as wind farms and solar arrays.

The controller 107 conducts electrical energy and distributes that electrical energy to the energy transfer interface 109. The controller 107 can include an energy busbar for conducting electrical energy. The controller 107 can include a disconnect that enables the controller 107 to act as an on/off switch to selectively supply the electrical energy to the energy transfer interface 109. In the on configuration, the controller 107 flows energy to the energy transfer interface 109. In the off configuration, the controller 107 prevents energy from flowing to the energy transfer interface 109.

The energy transfer interface 109 receives electrical energy from the controller 107 and transfers that electrical energy to an energy transfer interface 122 of a rail car 120. The energy transfer interface 109 can be a static non-mobile device that is affixed in a permanent location proximate to the energy generators 103. Optionally, the energy transfer interface 109 is a mobile device that can be moved to a given rail car 120 as needed, such as in response to the rail cars 120 arriving at the facility or to move from a rail car that has completed charging to a rail car needing charging. In one or more examples, the energy transfer interface 109 can be capable of both transmitting and receiving energy.

The energy transfer interface 109 can correspond to the type of energy transfer interface 122 of the rail car 120. For instance, the energy transfer interface 122 can be a contactless energy transfer interface and the energy transfer interface 109 can be a corresponding contactless energy transfer interface that receives energy from the energy transfer interface 109. The energy transfer interface 122 can be a pantograph and the energy transfer interface 109 can be a conductive wire that the pantograph is configured to contact. The energy transfer interface 122 can be a contactor and the energy transfer interface 109 can be a third rail or a mating contactor, such as a contact plate.

The energy consumption system 102 can include one or more energy transfer interfaces 110, a controller 108, and energy consumers 104. As shown in FIG. 1, arrows 114 connect the energy transfer interface 110, controller 108, and the energy consumers 104. In one or more examples, energy flows as indicated by the arrows 114 from the energy transfer interface 110 to the controller 108 and then to the energy consumers 104. Optionally, the energy consumption system 102 can include a transfer switch for selectively routing electrical energy.

The energy transfer interface 110 receives electrical energy from an energy transfer interface 122 of a rail car 120 and transmits that electrical energy to the controller 108. The energy transfer interface 110 can be a static non-mobile device that is affixed in a permanent location proximate to the energy consumers 104. Optionally, the energy transfer interface 110 is a mobile device that can be moved to a given rail car 120 as needed, such as in response to the rail cars 120 arriving at the facility or to move from a rail car that has completed discharging to a rail car needing discharging. In one or more examples, the energy transfer interface 110 can be an energy transfer interface that is capable of both transmitting and receiving energy.

The controller 108 controls the transfer of energy via the energy transfer interface 110 to the energy consumer 104. Similar to the controller 107 above, the controller 108 can include an energy busbar for conducting electrical energy. The controller 108 can include a disconnect that enables the controller 108 to act as an on/off switch to selectively supply electrical energy to the energy consumer 104. When in the energy transfer operational configuration, the controller 108 enables flow of energy to the energy consumers 104. When in the off configuration, the controller 108 prevents energy from flowing to the energy consumer 104.

The energy consumers 104 can include any facility or infrastructure configured to consume, transmit, or store electrical energy. For example, the energy consumers 104 can include a utility grid that supplies energy to a number of energy consumers such as individual homes, a manufacturing facility, an energy storage system, etc.

The rail car 120 can include one or more energy transfer interfaces 122 and one or more battery systems 126. The energy transfer interface 122 of the rail car 120 can receive energy from the energy generation system 101 and transmit energy to the energy consumption system 102. In one or more examples, the energy transfer interface 122 is one of a contactless interface, a pantograph, or a contact shoe that receives energy from a third rail or a contact plate. The battery system 126 of the rail car 120 can include one or more battery storage banks to store the energy received from the energy generation system 101 until the energy is transmitted to the energy consumption system 102. In one or more examples, the energy transfer interface 122 includes one or more inductive coils, and the battery system(s) may be configured to convert from the direct current (DC) of the batteries to alternating current (AC).

In one or more examples, the energy delivery system 100 can include a large number of rail cars 120, such as more than 10, more than 20, more than 30, more than 50, more than 100, or more than 200 rail cars 120, each loaded with one or more battery systems 126. Each rail car 120 in the energy delivery system 100 can include an energy transfer interface 122, such that each rail car 120 charges the battery system 126 of that rail car 120.

In one or more examples, the energy delivery system 100 can include a plurality of rail cars 120 but not every rail car 120 has an energy transfer interface 122. In such example, the rail cars 120 without an energy transfer interface 122 can be electrically connected to a rail car 120 that includes an energy transfer interface 122. The rail car(s) 120 that include an energy transfer interface 122 that can receive electricity from the energy generation system 101 and then flow that electricity into the one or more rail cars 120 without an energy transfer interface to charge/discharge the battery system(s) 126 of those rail cars 120. Beneficially, such configuration reduces the number of connection points between the energy transfer interface 109 of the energy generation system 101 and the rail cars 120.

Optionally, each rail car 120 has an energy transfer interface 122, but the energy transfer interfaces 122 can be toggled on or off such that only certain energy transfer interfaces 122 are used to transfer energy. For instance, only the energy transfer interfaces 122 of the rail cars 120 that are positioned such that the energy transfer interface 122 aligns with an energy transfer interface 109 or an energy transfer interface 110 will be toggled on, with all other energy transfer interfaces 122 that are not aligned with an energy transfer interface 109 or an energy transfer interface 110 toggled off. When discharging the battery systems 126 of the rail cars 120, the rail cars 120 with an energy transfer interface 122 that is not aligned with an energy transfer interface 110 can instead flow the energy stored in their battery system(s) 126 to a rail car 120 that is aligned with an energy transfer interface 110. When charging the battery systems 126 of the rail cars 120, the rail cars 120 with an energy transfer interface 122 that is not aligned with an energy transfer interface 109 will receive energy from a rail car 120 with an energy transfer interface 122 that is aligned with an energy transfer interface 109.

Figure 2:
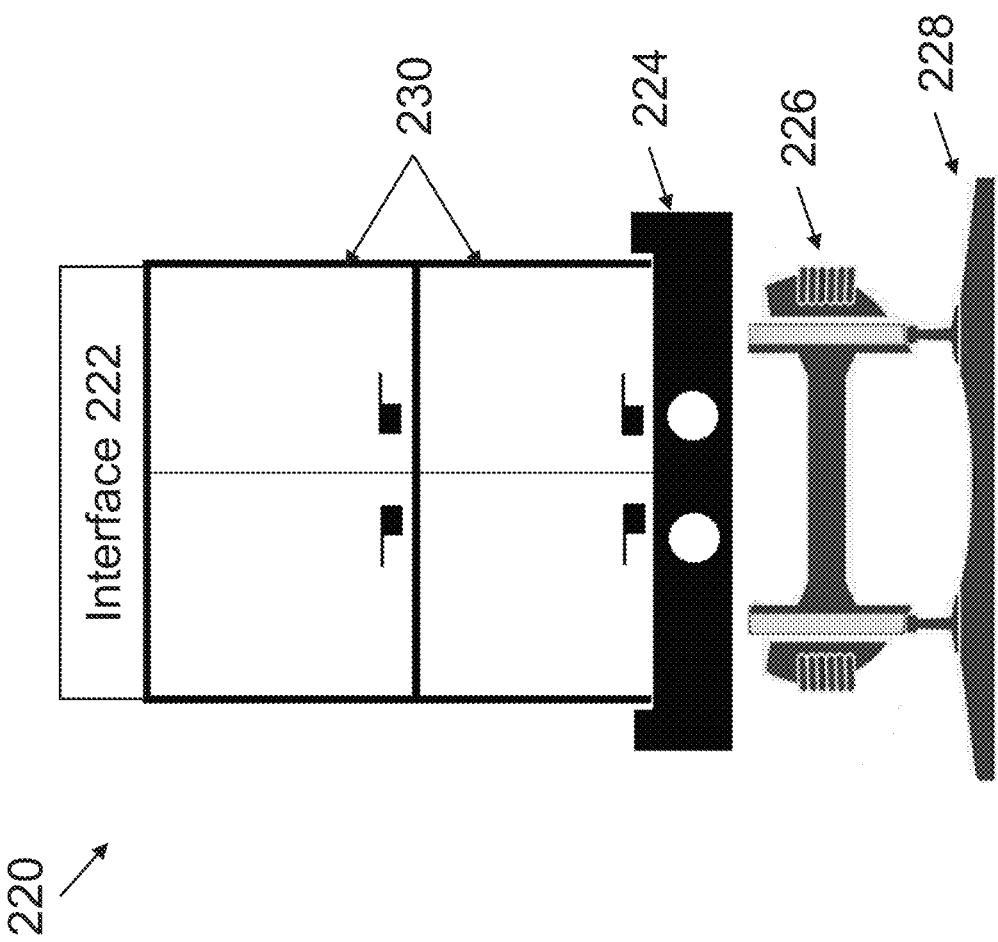
FIG. 2 shows an exemplary rail car for use in an energy delivery system, according to one or more examples of the present disclosure.

An exemplary rail car 220 is shown in FIG. 2. The rail car 220 can be used as the rail car 120 in the energy delivery system 100 to receive energy from an energy generation system and transmit that energy to an energy consumption system. The rail car 220 can include an energy transfer interface 222 and at least one container 230 loaded to a well car 224 that includes a plurality of railway wheels 226 that run on a railroad track 228. The interface 222 can be located on top of the battery system housing (e.g., container 230), such as for interfacing with corresponding interfaces of the facilities that are positioned above the tracks, or can be located at the bottom of the battery system housing, such as for contacting a third rail.

The well car 224 is sized to receive the containers 230 such that the containers 230 fit securely on the well car 224. The railway wheels 226 can be standard railroad wheels compatible with existing railroad tracks 228. The energy transfer interface 222 can be like the energy transfer interface 122 of FIG. 1. Optionally, the energy transfer interface 222 can be one of a contactless energy transfer interface configured to transfer energy wirelessly, a pantograph configured to interface with conductive wires, or a contact shoe configured to interface with a third rail or a contact plate.

Each of the containers 230 can be an intermodal container that is manufactured according to the specifications outlined by the International Organization for Standardization (ISO). Optionally, the containers 230 may be custom-designed with dimensions that are distinct from the ISO intermodal containers. As shown, the rail car 220 includes two stacked containers 230. The top container 230 is secured to the bottom container 230, such as via inter-box connectors (IBCs) or "twist locks." The bottom container 230 may be secured to a fastening element of the well car 224, such as via a bulkhead built into the well car 224.

In one or more examples, the containers 230 may be climate-controlled and include automatic fire-suppression systems, ventilation, and/or modularization technology such that multiple containers can be connected via electrical transmission lines to flow energy between containers 230. Each of the containers 230 can include a variety of electrical equipment for receiving, converting, directing, and/or storing electrical energy that is transmitted to and from the rail car 220.

Figure 3:
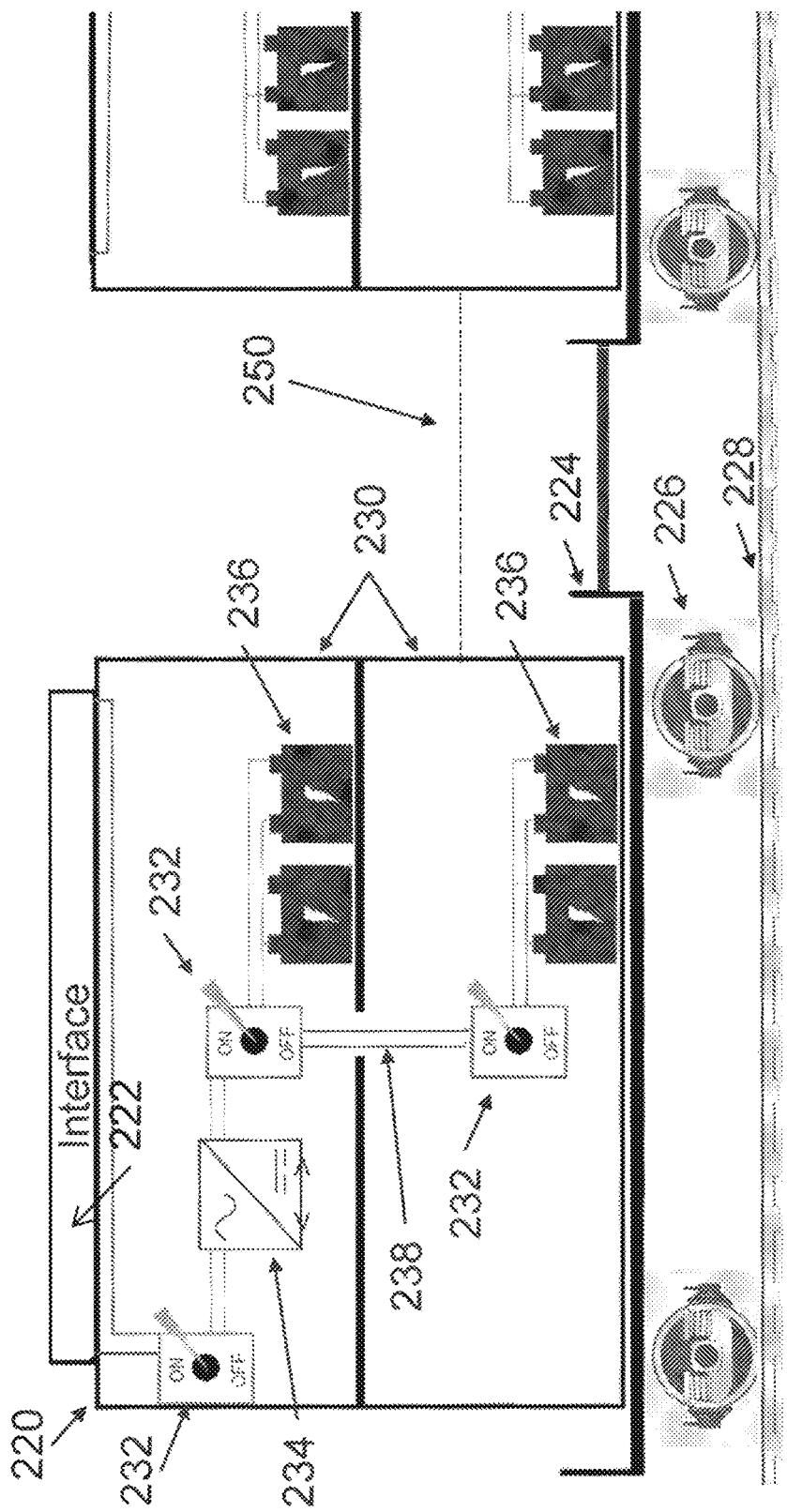
FIG. 3 shows a cut-away view of the exemplary rail car of FIG. 2, according to one or more examples of the present disclosure.

The electrical equipment of an exemplary rail car is shown in FIG. 3, which shows a cut-away view of the rail car 220 of FIG. 2, according to one or more examples of the present disclosure. Stored within the containers 230, the rail car 220 can include a number of controllers 232, a bidirectional inverter subsystem 234, and a number of storage banks 236 all connected by electrical transmission lines 238.

The electrical transmission lines 238 conduct the electrical energy between the components of the rail car 220. The electrical transmission lines 238 are bidirectional. For example, the electrical transmission lines 238 can conduct electrical energy from the energy transfer interface 222 to the storage banks 236 of one or both containers 230, and conduct electrical energy in reverse from the storage banks to the energy transfer interface 222.

The controllers 232 conduct electrical energy and distribute that electrical energy. As shown, the rail car 220 includes a first controller 232 that controls the electrical energy flow from the energy transfer interface 222 to the bidirectional inverter subsystem 234 (or vice versa), a second controller 232 that controls the electrical energy flow from the bidirectional inverter subsystem 234 to the storage bank 236 of the first container 230 or to the third controller 232 (or vice versa), and the third controller controls the electrical energy from the second controller 232 to the storage bank 236 of the second container 230 (or vice versa).

The bidirectional inverter subsystem 234 can convert electrical energy from alternating current (AC) to direct current (DC) and vice versa. If the rail car 220 receives AC electrical energy via the energy transfer interface 222, the bidirectional inverter subsystem 234 converts the AC electrical energy into DC electrical energy.

The storage banks 236 (e.g., batteries) can store the electrical energy the rail car 220 receives. The storage banks 236 can only store DC electrical energy. Accordingly, any AC electrical energy the rail car 220 receives must be converted to DC electrical energy via the bidirectional inverter subsystem 234. When the energy transfer interface 222 is configured only for transmitting and receiving AC electrical energy, the stored DC electrical energy must be converted back to AC electrical energy when the storage banks 236 are discharging their stored energy (such as at an energy consumption facility). Optionally, when charging/discharging, certain storage banks 236 can be toggled "on" such that they receive energy and certain storage banks 236 may be toggled "off" such that they do not receive energy. Toggling the storage banks 236 on or off can be controlled via one or more of the controllers 232.

The energy transfer interface 222 of the rail car 220 serves to transfer energy to the batteries of rail car 220 (such as from an energy generator) and/or from the batteries of the rail car 220 (such as to an energy consumer). In one or more examples, energy can be transferred from the batteries of the rail car 220 without relying on interface 222. For example, the rail car 220 can include one or more receptacles for receiving one or more power cords (e.g., different receptacles for different types of power cords) and transmit power via the power cords. Accordingly, the rail car 220 can deliver power to an area without fixed energy generation/consumption facilities, such as proximate to an area that has temporary energy consumption facilities (e.g., proximate to an area that experienced a natural disaster that requires temporary energy sources).

In one or more examples, the interface 222 is configured to interface with a corresponding energy transfer interface that remains proximate to the energy generation/consumption facility in order to charge/discharge the electrical energy of the rail car 200. As noted above, the energy transfer interface 222 of the rail car 220 can be one of a variety of types of energy transfer interfaces to interface with a contactless system, a pantograph system, a third rail system, and a retractable arm system. These energy transfer interface types will be discussed in turn below. Optionally, the rail car 220 can include multiple energy transfer interfaces 222 of a different type. For example, the rail car 220 can include an interface 222 configured to interface with a wireless system and another interface 222 configured to interface with a pantograph system, third rail system and/or a retractable arm system. Any other combination is possible.

As shown in FIG. 3, multiple rail cars, each loaded with battery systems can be connected to one another to form a train, which can be pulled by one or more locomotives. In some examples, an interface 222 is included for battery systems of each rail car. In other examples, there is no interface for battery systems of at least one rail car, and those battery systems are electrically connected via one or more inter-car connection line 250 to a battery system that does have an interface 222 (directly or via one or more battery systems of one or more other rail cars). This arrangement can reduce the number of energy transfer interfaces needed at the energy generation/consumption facilities.

Figure 4A:
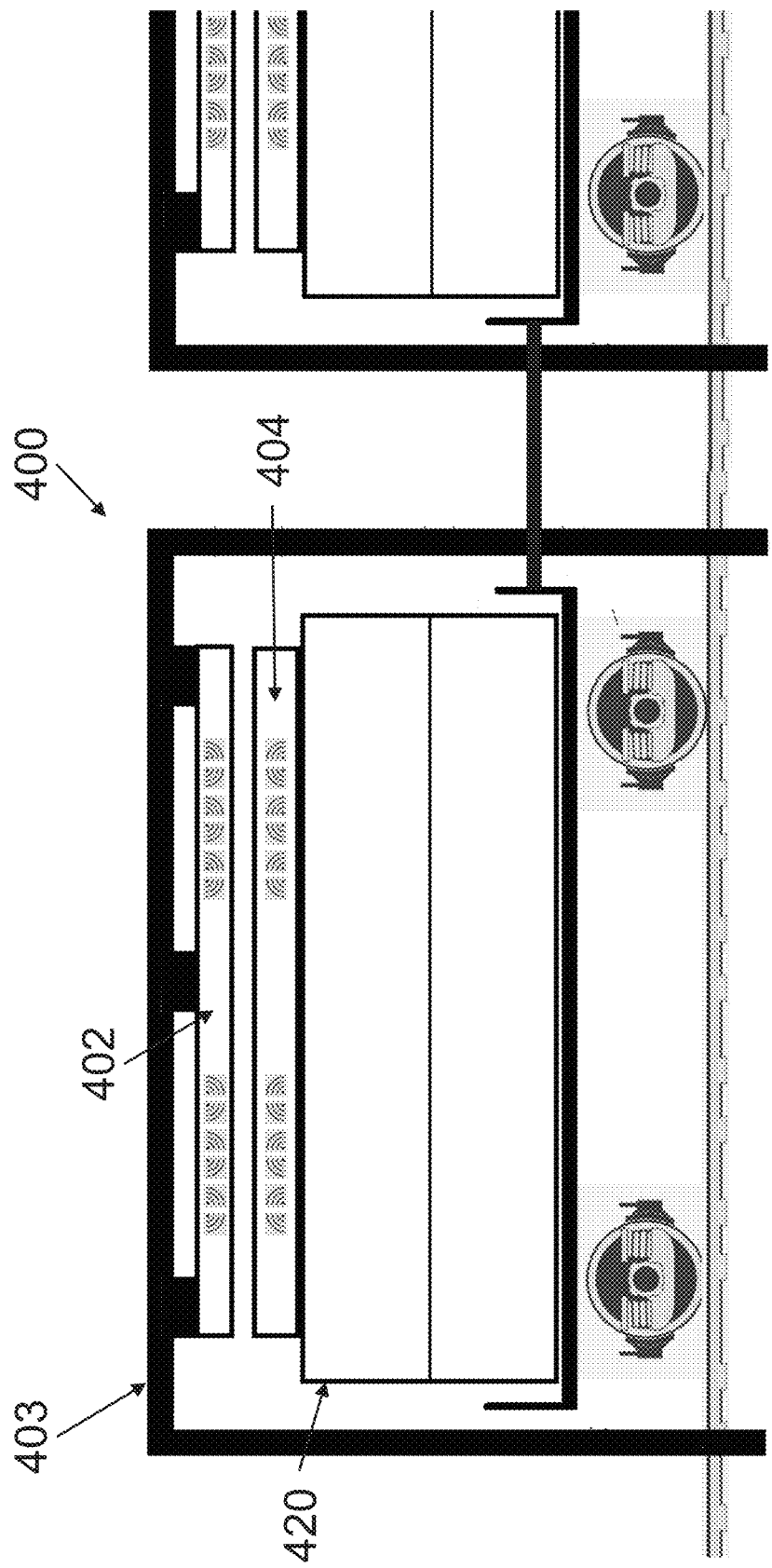
FIG. 4A shows an exemplary wireless system, according to one or more examples of the present disclosure.

FIG. 4A shows an exemplary wireless system 400, according to one or more examples of the present disclosure. The wireless system 400 includes a rail car 420 that has a first energy transfer interface 404, and a corresponding second energy transfer interface 402 mounted to a charging structure 403. The rail car 420 can be configured as the rail car 120 of FIG. 1 and/or the rail car 220 of FIGS. 2 and 3. In one or more examples, the wireless system 400 is a contactless system (e.g., configured to use wireless energy transfer interfaces to transfer energy).

The wireless system 400 can be located at an energy generation system and/or at an energy consumption system. For instance, an energy delivery system can include a first wireless system 400 proximate to an energy generation facility and a second wireless system 400 proximate to an energy consumption facility. A wireless system 400 proximate to an energy generation facility can be referred to as the "charging station" wherein electrical energy flows from the second energy transfer interface 402 of the charging structure 403 to the first energy transfer interface 404 of the rail car 420. A wireless system 400 proximate to an energy consumption facility can be referred to as the "discharging station" wherein electrical energy flows from the first energy transfer interface 404 of the rail car 420 to the second energy transfer interface 402 of the charging structure 403. Flowing electrical energy from the rail car 420 to the second energy transfer interface 402 located at the energy consumption facility can include discharging the stored energy from storage banks of the rail car 420.

To charge/discharge rail cars 420, the charging structure 403 can be positioned above a railroad track. The charging structure 403 can be sized to receive any suitable rail car, such as a box car or a well car with one or two containers. For instance, where the containers of the rail car 420 are ISO containers, the charging structure 403 can be elevated above a railroad track centerline above the track such that rail cars with one or two stacked ISO containers can move freely underneath the charging structure 403. The charging structure 403 can be permanently affixed above the railroad tracks at each charging/discharging station. Optionally, rather than located above the rail car 420, the charging structure 403 can instead be located along one of the sides of the rail car 420, or beneath the rail car 420.

Figure 4B:
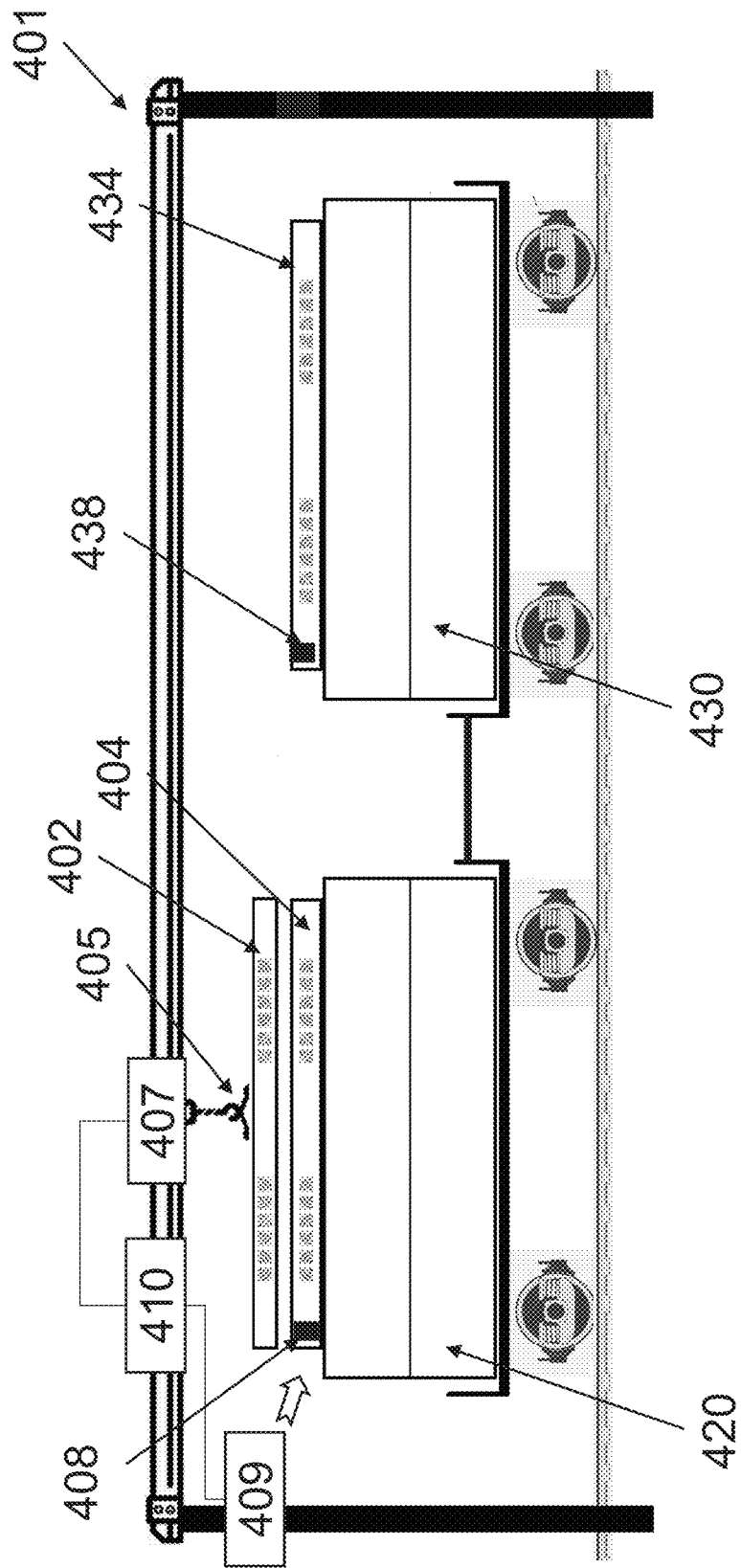
FIG. 4B shows an exemplary crane system, according to one or more examples of the present disclosure.

Optionally, the charging/discharging station can include a crane system to charge/discharge batteries of the rail cars 420. FIG. 4B shows an exemplary crane system 401, according to one or more examples of the present disclosure. The crane system 401 includes a movable crane 405 that holds the second energy transfer interface 402. The crane 405 can be located proximate a railroad track and configured to lift the second energy transfer interface 402 such that it engages with the first energy transfer interface 404 of the rail car 420. In one or more examples, the crane system 401 is a contactless system (e.g., configured to use wireless energy transfer interfaces to transfer energy). Optionally, the crane system 401 can be a contact system (e.g., configured to use contact between corresponding energy transfer interfaces to transfer energy).

The crane system 401 can include one or more actuators 407 for moving crane 405 to a desired location and a controller 410 for controlling the actuator 407 to move the crane 405. The controller 410 can received signals from one or more sensors 409 that can detect a location of the energy transfer interface 404 of the rail car 420. The controller 410 can receive the information from the sensors 409 and control the crane 405 to move the second energy transfer interface 402 of the crane system 401 such that it aligns with the first energy transfer interface 404 of the rail car 420. The one or more sensors 409 can include any suitable sensor or combination of sensors mounted in any suitable location or combination of locations for determining a location of the energy transfer interface 404. For example, the one or more sensors 409 can include one or more proximity sensors (e.g., acoustic, infrared, laser, etc.) mounted to the energy transfer interface 402, to the supporting structure, and/or any other suitable location that detect proximity of one or more targets 408 of the energy transfer interface 404. The one or more sensors 409 can include a camera that captures images of the energy transfer interface 404 and transfers those images to the controller 410 for analysis. The one or more sensors 409 can optionally detect a location of the energy transfer interface 402 for determining alignment with the energy transfer interface 404. The controller 410 can use any suitable image processing algorithm to detect the location of the energy transfer interface 404, such as by comparing the target 408 to a predetermined configuration of the target 408 to determine the location of the target 408 relative to the camera. The controller 410 can include one or more processors, memory, and one or more programs stored in the memory for execution by the one or more processors for causing the controller to receive sensor data from the one or more sensors 409, process the sensor data to determine a location of the energy transfer interface 404 or other portion of the rail car 420, and control the actuator 407 to move the energy transfer interface 402 (via crane 405) to a location corresponding to the location of the energy transfer interface 404 for transferring energy between the energy transfer interfaces 402, 404 (e.g., properly aligned in the −x, −y, and/or −z directions for energy transfer).

The controller 410 can detect (via sensor data) when the energy transfer interface 402 is properly positioned for energy transfer and can control the energy transfer interface 402 to transfer energy to or from the energy transfer interface 404 of the rail car 420. For example, the controller 410 can be connected to a controller of the energy generation facility (such as controller 107 of FIG. 1), a controller of the energy consumption facility (such as controller 108 of FIG. 1), and/or a controller of the rail car 420 (such as one or more of controllers 232 of FIG. 2). Upon determining that the energy transfer interface 402 is properly positioned, the controller 410 can control the controllers of the rail car and the corresponding local controller (e.g., the controller of the energy generation or energy consumption facility) to allow energy to flow.

The crane system 401 can be located at an energy generation system and/or at an energy consumption system. For instance, an energy delivery system can include a first crane system 401 proximate to an energy generation facility and a second crane system 401 proximate to an energy consumption facility. A crane system 401 proximate to an energy generation facility can be referred to as the "charging station" wherein electrical energy flows from the second energy transfer interface 402 of the crane system 401 to the first energy transfer interface 404 of the rail car 420. A crane system 401 proximate to an energy consumption facility can be referred to as the "discharging station" wherein electrical energy flows from the first energy transfer interface 404 of the rail car 420 to the second energy transfer interface 402 of the crane system 401. Flowing electrical energy from the rail car 420 to the second energy transfer interface 402 located at the energy consumption facility can include discharging the stored energy from storage banks of the rail car 420.

To charge/discharge rail cars 420 using the crane system 401, the crane system 401 can be positioned above a railroad track. The crane system 401 can be sized to receive a well car with two containers. For instance, where the containers of the rail car 420 are ISO containers, the crane system 401 can be elevated above a railroad track centerline above the track such that rail cars with one or two stacked ISO containers can move freely underneath the crane system 401. Optionally, the crane system 401 can be permanently affixed above the railroad tracks at each charging/discharging station.

In one or more examples, the controller 410 controls the movable crane 405 to lift the second energy transfer interface 402 to an appropriate height to engage the second energy transfer interface 402 with a corresponding first energy transfer interface 404 of the rail car 420. If the first energy transfer interface 404 is located on top of the rail car 420, the crane system 401 can lift the second energy transfer interface 402 to the appropriate height to engage with the first energy transfer interface 402 whether the rail car 420 is a double stack (as shown in FIG. 4B) or just a single stack. Additionally, if the second energy transfer interface 402 is located on a side of the rail car 420, the crane system 401 can lift the second energy transfer interface 402 to the appropriate height to engage with the side-mounted first energy transfer interface 404 of the rail car 420. The crane system 401 can be configured such that in addition to moving the second energy transfer interface 402 vertically, the crane system 401 can also move the second energy transfer interface horizontally. Thus, the crane system 401 can align the second energy transfer interface 402 with the corresponding first energy transfer interface 404 of the rail car 420 without requiring the rail car 420 to be precisely parked in a specific location in order to charge/discharge, such as by using the controller 410 and one or more sensors 409 to properly position the second energy transfer interface 402, as discussed above.

In one or more examples, after charging or discharging the battery system of a first rail car (e.g., rail car 420), the crane system 401 can move horizontally along the length of a train comprising multiple rail cars 420 to sequentially charge/discharge the rail cars 420 without requiring the train to move. For example, the controller 410 can move the crane 405 and the second energy transfer interface 402 from a position proximate to the energy transfer interface 404 of a first rail car 420 to a position proximate to the energy transfer interface 434 of an adjacent rail car 430. When relocating the crane 405 proximate to the energy transfer interface of an adjacent rail car, the controller 410 can follow a similar process to precisely position the energy transfer interface 402 proximate to the energy transfer interface 434 of the adjacent rail car 430 (e.g., use one or more proximity sensors to detect the proximity of one or more targets 438 of the energy transfer interface 434 of the adjacent rail car 430, determine the location of the energy transfer interface 434, or other portion of the rail car 430, and control the actuator 407 to move the energy transfer interface 407 via the crane 405 to a location corresponding to the location of the energy transfer interface 434.

Referring now to both FIGS. 4A and 4B, where one or more of the wireless system 400 and the crane system 401 is a contactless system, the first energy transfer interface 404 and second energy transfer interface 402 can include hardware, such as one or more inductive coils and associating driving circuitry, configured to transfer electrical energy wirelessly when the first energy transfer interface 404 and the second energy transfer interface 402 are located sufficiently proximate one another. This distance can be, for example, 5 mm or less, 20 mm or less, 100 mm or less, 300 mm or less, 500 mm or less, 1 meter or less, etc.

The wireless system 400 and/or the crane system 401 can be an inductive system that includes corresponding inductive coupling coils that transfer electrical energy both wirelessly and without requiring contact between the corresponding coils. For instance, the first energy transfer interface 404 can include a wound copper or aluminum coil and the second energy transfer interface 402 can include a corresponding wound aluminum or copper coil, such that when the second energy transfer interface 402 is located beneath the first energy transfer interface 404, the electrical energy can flow between the first energy transfer interface 404 and the second energy transfer interface 402 wirelessly and without requiring the corresponding coils to contact one another. In one or more examples, the first energy transfer interface 404 and the second energy transfer interface 402 can only transfer AC electrical energy.

Where the crane system 401 is instead a contact system, the first energy transfer interface 402 and the second energy transfer interface 404 can be configured to transmit energy via contact between one another. For instance, one of the first energy transfer interface 402 and the second energy transfer interface 404 can be a contact shoe configured to transfer energy from/to an energized plate when contacting the energized plate.

Figure 5:
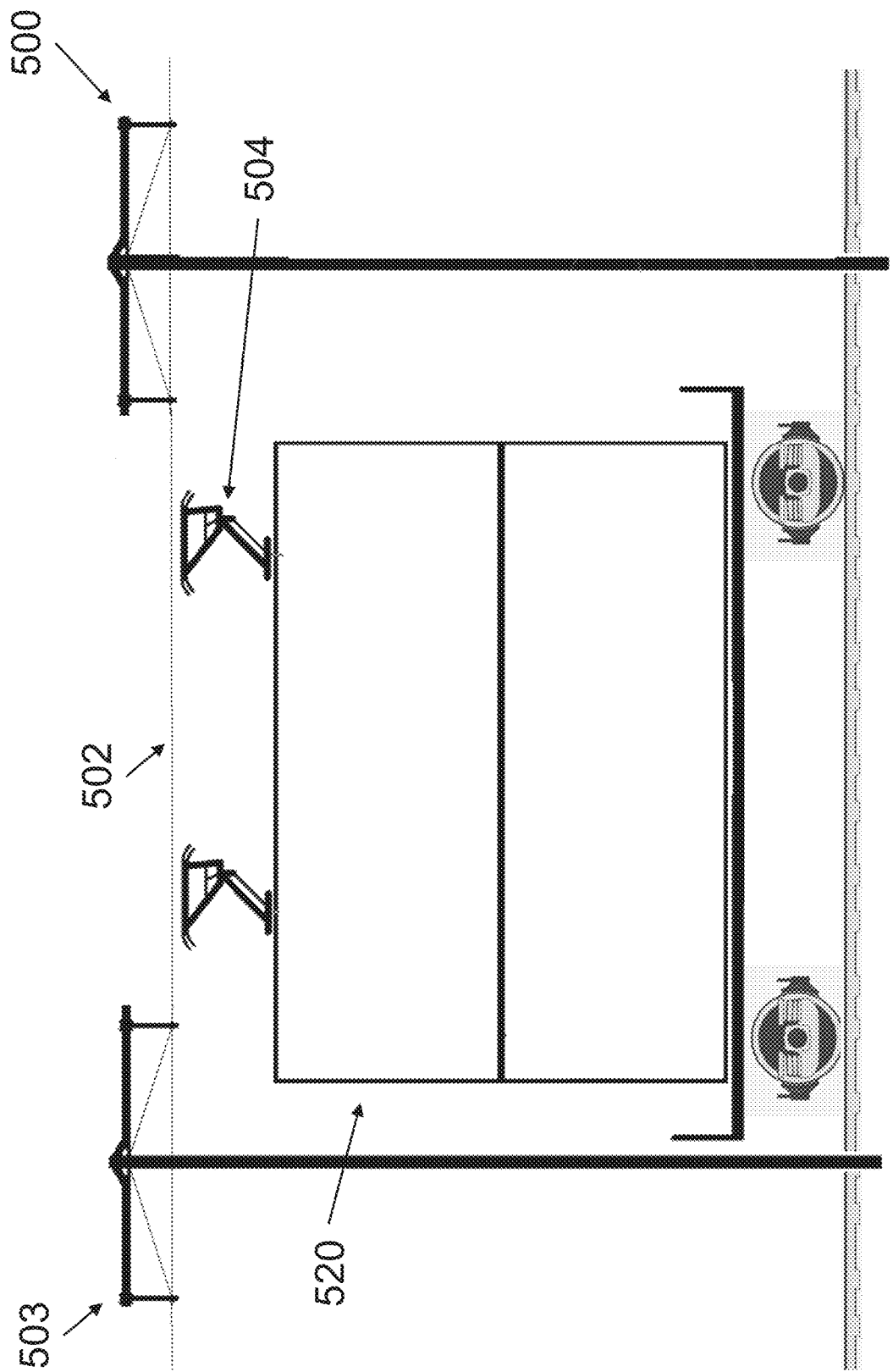
FIG. 5 shows an exemplary pantograph rail car system, according to one or more examples of the present disclosure.

FIG. 5 shows an exemplary pantograph system 500, according to one or more examples of the present disclosure. The pantograph system 500 includes a rail car 520 that has a pantograph 504 engaged with a conductive wire 502 mounted to an overhead wire system 503. The rail car 520 can be configured as the rail car 120 of FIG. 1 and/or the rail car 220 of FIGS. 2 and 3.

The pantograph system 500 can be located at an energy generation system and/or at an energy consumption system. For instance, an energy delivery system can include a first pantograph system 500 proximate to an energy generation facility and a second pantograph system 500 proximate to an energy consumption facility. A pantograph system 500 proximate to an energy generation facility can be referred to as the "charging station" wherein electrical energy flows from the conductive wire 502 of the overhead wire system 503 to the pantograph 504 of the rail car 520. A pantograph system 500 proximate to an energy consumption facility can be referred to as the "discharging station" wherein electrical energy flows from the pantograph 504 of the rail car 520 to the conductive wire 502 of the overhead wire system 503. Flowing electrical energy from the rail car 520 to the conductive wire 502 located at the energy consumption facility can include discharging the stored energy from storage banks of the rail car 520.

To charge/discharge rail cars 520, the conductive wire 502 of the overhead wire system 503 can be positioned above a railroad track. The overhead wire system 503 can be sized to receive a well car with two containers. For instance, where the containers of the rail car 520 are ISO containers, the overhead wire system 503 can be elevated above a railroad track centerline above the track such that rail cars with one or two stacked ISO containers can move freely underneath the overhead wire system 503. The overhead wire system 503 and the conductive wire 502 can be permanently affixed above the railroad tracks at each charging/discharging station.

The pantograph 504 can be engaged with the conductive wire 502 such that the pantograph 504 contacts the conductive wire 502. For instance, the pantograph 504 can include a spring-loaded structure that pushes a contact shoe up against the underside of the conductive wire 502 to contact the conductive wire 502 and draw current from the conductive wire 502, or transmit current to the conductive wire 502. In some examples, the pantograph is actuated such that it can be retracted when the train is not located at an energy generation/consumption facility and extended for contacting the overhead lines when located at an energy generation/consumption facility.

FIG. 6A shows an exemplary third rail system 600, according to one or more examples of the present disclosure. The third rail system 600 includes a rail car 620 and a contact shoe 604 that extends beneath the rail car for engaging with a live rail 602. The rail car 620 can be configured as the rail car 120 of FIG. 1 and/or the rail car 220 of FIGS. 2 and 3.

The third rail system 600 can be located at an energy generation facility and/or at an energy consumption facility. For instance, an energy delivery system can include a first third rail system 600 proximate to an energy generation facility and a second third rail system 600 proximate to an energy consumption facility. A third rail system 600 proximate to an energy generation facility can be referred to as the "charging station" wherein electrical energy flows from the live rail 602 to the contact shoe 604 of the rail car 620. A third rail system 600 proximate to an energy consumption facility can be referred to as the "discharging station" wherein electrical energy flows from the contact shoe 604 of the rail car 620 to the live rail 602. Flowing electrical energy from the rail car 620 to the live rail 602 located at the energy consumption facility can include discharging the stored energy from storage banks of the rail car 620.

To charge/discharge rail cars 620, the live rail 602 (e.g., the "third rail") can be placed between or outside the running rails of the railroad track 228 and energized with electrical energy. The live rail 602 can be sized such that rail cars can move freely above the live rail 602. The live rail 602 can be permanently affixed between the railroad track 228 at each charging/discharging station.

The contact shoe 604 can be engaged such that the live rail 602 contacts the contact shoe 604. The contact shoe 604 can be a "sliding shoe" configured to slide over the live rail 602 as the rail car 620 moves. The contact shoe 604 can include an attachment arm 605 that extends into the container(s) of the rail car 620 to transmit energy between the storage banks of the rail car 620 and the live rail 602 at the charging/discharging stations. Optionally, the contact shoe 604 may recede to a position within the interior of the rail car 620 (such as within the bottom container) while the rail car 620 travels between the charging/discharging stations, and then extend to the position shown in FIG. 6A where the contact shoe 604 contacts the live rail 602 while actively charging/discharging.

Figure 6B:
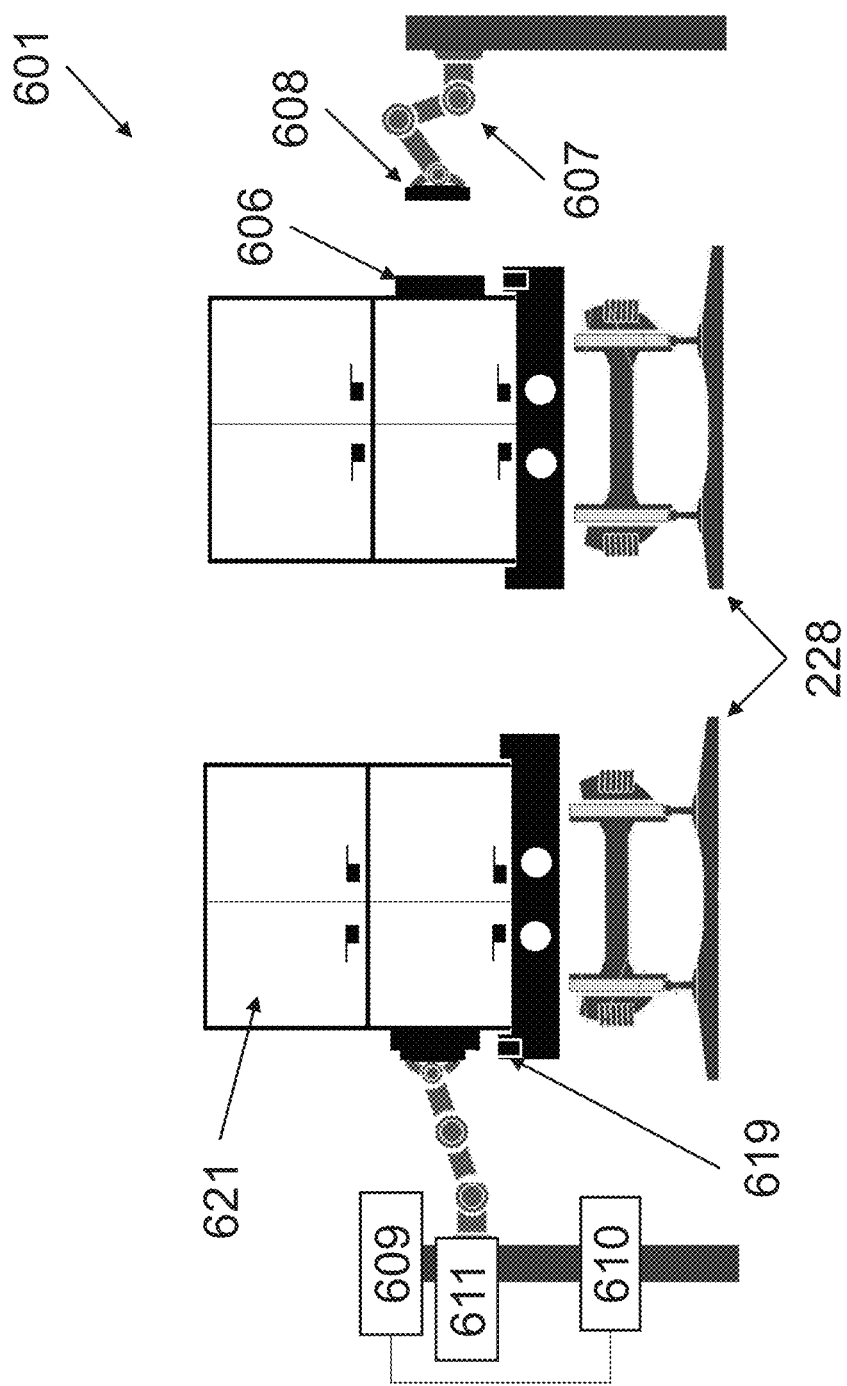
FIG. 6B shows an exemplary retractable arm system, according to one or more examples of the present disclosure.

FIG. 6B shows an exemplary retractable arm system 601, according to one or more examples of the present disclosure. The retractable arm system 601 includes a rail car 621 and a contact shoe 606 that engages with a contact plate 608 of a retractable arm 607. The rail car 621 can be configured as the rail car 120 of FIG. 1 and/or the rail car 220 of FIGS. 2 and 3. In one or more examples, the retractable arm system 601 is a contact system (e.g., configured to rely on contact between corresponding energy transfer interfaces, such as a contact shoe and plate, to transfer energy. Optionally, the retractable arm system 601 is a contactless system (e.g., configured to rely on wireless energy transfer interfaces to transmit/receive energy).

The retractable arm system 601 can include one or more actuators 611 for moving the retractable arm 607 to a desired location and a controller 610 for controlling the actuator 611 to move the retractable arm 607. The controller 610 can receive signals from one or more sensors 609 that can detect a location of the contact shoe 606 of the rail car 621. The controller 610 can receive the information from the sensors 609 and control the retractable arm 607 to move the contact plate 608 of the retractable arm system 601 such that it aligns with the contact shoe 606 of the rail car 621. The one or more sensors 609 can include any suitable sensor or combination of sensors mounted in any suitable location or combination of locations for determining a location of the contact shoe 606. For example, the one or more sensors 609 can include one or more proximity sensors (e.g., acoustic, infrared, laser, etc.) mounted to the contact plate 608, to the supporting structure, and/or any other suitable location that detect proximity of one or more targets 619 of the contact shoe 606 of the rail car 621. The one or more sensors 609 can include a camera that captures images of the contact shoe 606 and transfers those images to the controller 610 for analysis. The one or more sensors 609 can optionally detect a location of the contact shoe 606 for determining alignment with the contact plate 608. The controller 610 can use any suitable image processing algorithm to detect the location of the contact shoe 606, such as by comparing the target 619 to a predetermined configuration of the target 619 to determine the location of the target 619 relative to the camera. The controller 610 can include one or more processors, memory, and one or more programs stored in the memory for execution by the one or more processors for causing the controller to receive sensor data from the one or more sensors 609, process the sensor data to determine a location of the contact shoe 606 or other portion of the rail car 621, and control the actuator 611 to move the contact plate 608 (via retractable arm 607) to a location corresponding to the location of the contact shoe 606 for transferring energy between the contact shoe 606 and the contact plate 608 (e.g., properly aligned in the −x, −y, and/or −z directions for energy transfer).

The controller 610 can detect (via sensor data) when the contact plate 608 is properly positioned for energy transfer and can control the contact plate 608 to transfer energy to or from the contact shoe 606 of the rail car 621. For example, the controller 610 can be connected to a controller of the energy generation facility (such as controller 107 of FIG. 1), a controller of the energy consumption facility (such as controller 108 of FIG. 1), and/or a controller of the rail car 621 (such as one or more of controllers 232 of FIG. 2). Upon determining that the contact plate 608 is properly positioned, the controller 610 can control the controllers of the rail car and the corresponding local controller (e.g., the controller of the energy generation or energy consumption facility) to allow energy to flow.

The retractable arm system 601 can be located at an energy generation facility and/or at an energy consumption facility. For instance, an energy delivery system can include a first retractable arm system 601 proximate to an energy generation facility and a second retractable arm system 601 proximate to an energy consumption facility. A retractable arm system 601 proximate to an energy generation facility can be referred to as the "charging station" wherein electrical energy flows from the contact plate 608 to the contact shoe 606 of the rail car 621. A retractable arm system 601 proximate to an energy consumption facility can be referred to as the "discharging station" wherein electrical energy flows from the contact shoe 606 of the rail car 621 to the contact plate 608. Flowing electrical energy from the rail car 621 to the contact plate 608 located at the energy consumption facility can include discharging the stored energy from storage banks of the rail car 621.

The retractable arm 607 can be placed adjacent to the railroad tracks. As shown in FIG. 6B, a pair of retractable arms 607 are located adjacent a pair of railroad tracks 228. Optionally, the retractable arm system 601 can include only one retractable arm 607, multiple retractable arms 607 along one side of the railroad tracks 228, multiple retractable arms 607 surrounding a single pair or railroad tracks 228, etc.

To charge/discharge rail cars 621, the controller 610 can move the retractable arm 607 as described above such that the contact plate 608 aligns with a contact shoe 606 of the rail car 621. In one or more examples, the controller 610 moves the retractable arm 607 such that the contact plate 608 contacts the contact shoe 606 of the rail car 621. In one or more examples, the controller 610 moves the retractable arm 607 to move the contact plate 608 horizontally from a position wherein the contact plate 608 is not contacting the contact shoe 606 (as shown with respect to the rightmost rail car 621 of FIG. 6B), to a position wherein the contact plate 608 contacts the contact shoe 606 of a rail car 621 (as shown with respect to the leftmost rail car 621 of FIG. 6B). The retractable arm 607 can be configured to move vertically when moving the contact plate 608 such that it contacts the contact shoe 606 of the rail car 606. In one or more examples, the retractable arm 607 moves the contact plate 608 both vertically and horizontally in order to align the contact plate 608 with the contact shoe 606 of the rail car 621. Optionally, the retractable arm 607 moves the contact plate 608 near the contact shoe 606 without contacting the contact shoe 606. In such case, the contact shoe 606 and contact plate 608 can be configured to transfer energy in a contactless manner (such as via wireless energy transceivers as discussed above).

The contact shoe 606 of the rail car 621 can be located on a side of the rail car 621 (as shown in FIG. 6B), on top of the rail car 621, and/or beneath the rail car 621. Accordingly, the retractable arm 607 can be configured to move the contact plate 608 in order to locate the contact plate 608 such that it contacts (or is near to when including a contactless system) the contact shoe 606 in any of these locations. Optionally, the contact shoe 606 extends through the exterior shell of the rail car 621 and connects to an interior frame inside of the rail car 621. Optionally, the contact shoe 606 may recede to a position within the interior of the rail car 621 while the rail car 621 travels between the charging/discharging stations and then extends to the exterior of the rail car 621 while actively charging/discharging.

Figure 7:
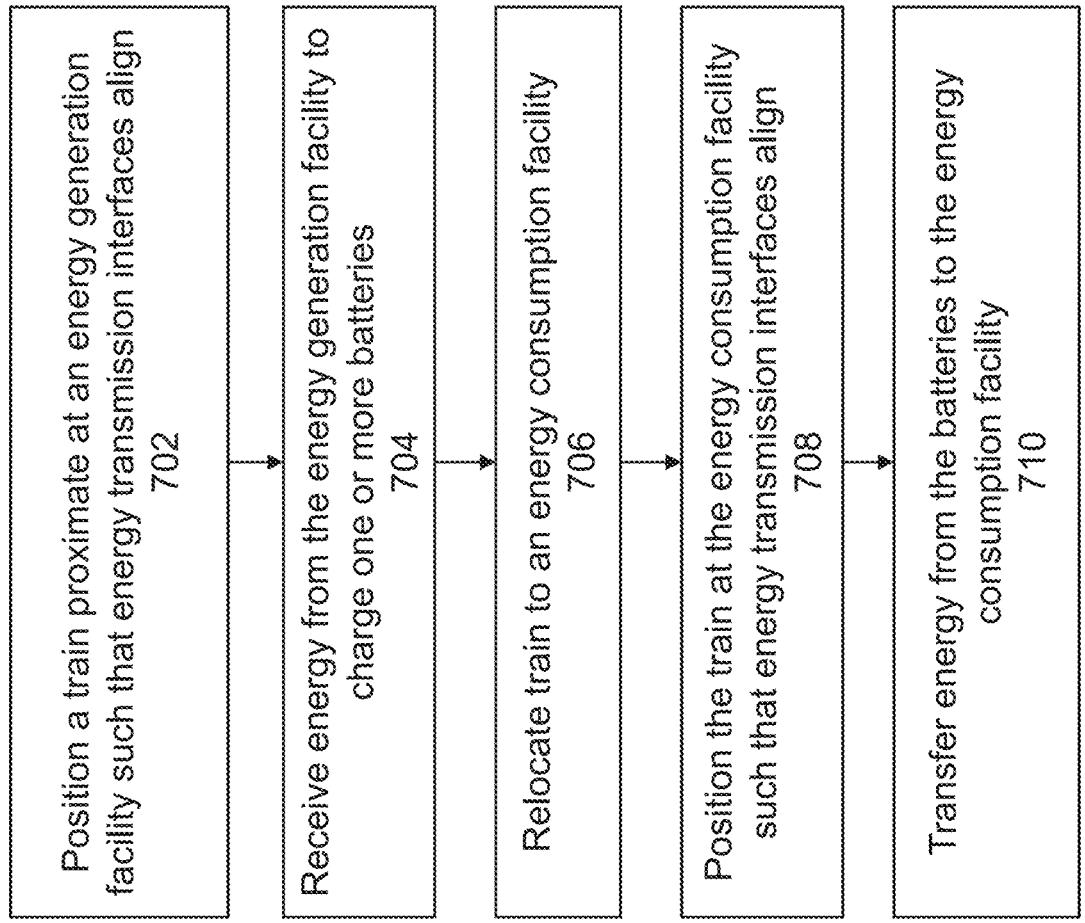
FIG. 7 shows an exemplary method for transporting energy from an energy generation facility to an energy consumption facility via a rail car system, according to one or more examples of the present disclosure.

FIG. 7 shows an exemplary method 700 for transporting energy from an energy generation facility to an energy consumption facility via a rail car system, according to one or more examples of the present disclosure. The method 700 can be performed via the energy delivery system 100 of FIG. 1, using the rail car 220 of FIGS. 2 and 3, and any of the wireless system 400 of FIG. 4A, the crane system 401 of FIG. 4B, the pantograph system 500 of FIG. 5, the third rail system 600 of FIG. 6A, or the retractable arm system 601 of FIG. 6B. Accordingly, the method 700 can implement contactless energy delivery (e.g., including wireless energy transceivers/transmitters/receivers) or contact energy delivery (e.g., including a pantograph or contact shoe in direct contact with an energized energy transceiver (such as a wire, live rail, or plate).

In one or more examples, the method 700 begins at step 702, wherein a train is positioned proximate to an energy transfer interface at an energy generation facility such that the energy transfer interface of the train aligns with the energy transfer interface of the energy generation facility. The train can include any number of rail cars each including one or more batteries for storing energy with one or more of the rail cars including an energy transfer interface for receiving/transmitting energy. Optionally, there can be multiple energy transfer interfaces near the energy generation facility and positioning the train at step 702 can involve aligning energy transfer interfaces with all, or less than all of the interfaces of the energy generation facility.

Where the method 700 involves a contactless energy delivery system, positioning the train at step 702 can include positioning the train such that one or more energy transfer interfaces of the one or more rail cars align with a corresponding energy transfer interface of the energy generation facility. Positioning the energy transfer interface(s) to align with the energy transfer interfaces can include locating the energy transfer interface(s) of the rail car(s) and the energy transfer interface(s) near one another but separated such that they do not touch one another. Positioning the energy transfer interface(s) to align with the energy transfer interfaces can include locating the energy transfer interface(s) of the rail car(s) within a specified distance of the energy transfer interface(s). For instance, this distance can be less than 5 mm, 20 mm, 100 mm, 300 mm, etc.

Where the method 700 involves a contact energy delivery system, positioning the train at step 702 can include positioning energy interfaces of the train such that they contact a corresponding energy interface proximate to the energy generation facility. For example, where the method 700 involves a pantograph system, positioning the train at step 702 can include positioning the train such that one or more pantographs of the one or more rail cars align with and contact a conductive wire of the energy generation facility. Where the method 700 involves a third rail system, positioning the train at step 702 can include positioning the train such that one or more contact shoes of the one or more rail cars align with and contact a live rail of the energy generation facility. Where the method 700 involves a retractable arm system that has a contact shoe, positioning the train at step 702 can include positioning the train such that one or more retractable arms can align a plate with the one or more contact shoes of the one or more rail cars. Where the method 700 involves a crane system that has a contact shoe, positioning the train at step 702 can include positioning the train such that one or more cranes can align a plate with the one or more contact shoes of the one or more rail cars.

In one or more examples, after positioning the train at step 702, a controller and one or more sensors can be used to precisely locate corresponding energy transfer interfaces of the train and the energy generation facility proximate to one another. For example, the sensors can sense the location of an energy transfer interface of one or more rail cars of the train and relay that information to a controller that controls a system, such as a crane system 401 of FIG. 4B or retractable arm system 601 of FIG. 6B, to move a corresponding energy transfer interface such that it aligns with the energy transfer interface of the one or more rail cars of the train. To locate energy transfer interfaces appropriately for energy transfer, a controller can receive information from one or more sensors (e.g., proximity sensors mounted in any suitable location or combination of locations), detect the location of the energy transfer interface of the rail car (e.g., using any suitable image processing algorithm), and control an actuator to move the local energy transfer interface (such as the energy transfer interface of the energy generation facility) to move the energy transfer interface to the location of the energy transfer interface of the rail car for transferring energy between the energy transfer interfaces (e.g., properly aligned in the −x, −y, and/or −z directions).

After positioning the train at step 702, the method 700 can move to step 704 wherein energy is received from the energy transfer interface via the energy transfer interface to charge one or more batteries. When charging the one or more batteries, individual batteries of the one or more rail cars may be toggled on such that they are actively being charged (e.g., receiving energy), or toggled off such that they are not actively being charged. Prior to receiving energy at step 704, the method can include turning a controller into an "on" configuration such that energy is permitted to flow from the one or more energy transfer interfaces of the facility to the one or more energy transfer interfaces of the train. The energy received at step 704 can be AC electrical energy. Optionally, the energy received at step 704 is DC electrical energy. In one or more examples, a controller can detect (such as via sensor data) when the energy transfer interface of the rail car is properly positioned for energy transfer and control the local energy transfer interface to transfer energy to or from the energy transfer interface of the rail car. For instance, a controller can be connected to a local controller (e.g., of the energy generation facility) and a controller of the rail car (such as one or more of controllers 232 of FIG. 2) and control those controllers to allow energy to flow.

Receiving energy at step 704 can include flowing energy into each rail car of the train. Optionally, only certain rail cars will have an energy transfer interface and receiving energy at step 704 can include flowing energy into the rail cars of the train that do have an energy transfer interface. Optionally, the rail cars of the train can be electrically connected to one another such that any rail car without an energy transfer interface receives electrical energy from adjacent rail cars or from a rail car that does have an energy transfer interface. In one or more examples, the batteries of the rail cars of the train are charged simultaneously. The charge time (e.g., the time required to charge the rail cars of the train) can depend on the amount of energy available from the energy generation facility.

Where the method 700 involves a contactless energy delivery system, receiving energy at step 704 can include allowing electrical energy to energize an inductive energy transfer interface such as a transmission coil, which then in a contactless manner transmits that energy to an inductive energy transfer interface such as an energy transfer interface coil of the one or more rail cars. Where the method 700 involves a contact energy delivery system, receiving energy at step 704 can include using a contact energy transmission interface such as a pantograph or contact shoe for transferring energy. For example, where the method 700 involves a pantograph system, receiving energy at step 704 can include contacting the pantograph of one or more rail cars that have a conductive wire of the energy generation facility such that the pantograph receives energy from the conductive wire. Where the method 700 involves a third rail system, a crane system, or retractable arm system configured to engage with a contact shoe, receiving energy at step 704 can include contacting the contact shoe of one or more rail cars that have a corresponding contact energy transmission interface (e.g., a live rail or plate) of the energy generation facility to transmit energy to the contact shoe.

As discussed above with respect to FIG. 3, energy received via one of the contact energy delivery or contactless energy delivery systems can flow to one or more controllers and an inverter subsystem before reaching the batteries (e.g. storage banks) of the rail cars, as discussed with respect to FIG. 3. When the energy received is AC electrical energy, the AC electrical energy is converted into DC electrical energy (such as via an inverter subsystem) before being stored in the one or more batteries of the rail cars.

After receiving the energy at step 704, the method can move to step 706 wherein the train is relocated to an energy consumption facility. Relocating the train at step 706 can include driving the train from the energy generation facility to the energy consumption facility using existing railroad tracks. In one or more examples, there is no disconnection process necessary once the batteries of the rail cars are charged before relocating the train.

After relocating the train at step 706, the method can move to step 708, wherein the train is positioned such that the energy transfer interface is aligned with a corresponding energy transfer interface of the energy consumption facility. Positioning the train at step 708 can be performed in the same manner as positioning the train as step 702. As noted above, both the energy transfer interface of the energy generation facility (e.g., the charging station) and the energy transfer interface of the energy consumption facility (e.g., the discharging station) can be an interface that both receives and transmits energy. Accordingly, the only difference between positioning the train at step 702 and positioning the train at step 708 can be based on the physical location, e.g., at the charging station near the energy generation facility versus at the discharging station near the energy consumption facility.

After positioning the train at step 708, the method can move to step 710, wherein energy is transferred to the energy consumption facility via the respective energy transfer interfaces, thus discharging the one or more batteries. When discharging the one or more batteries, individual batteries of the one or more rail cars may be toggled on such that they are actively being discharged (e.g., transmitting energy), or toggled off such that they are not actively being discharged. Prior to transmitting energy at step 710, the method can include turning a controller into an "on" configuration such that energy is permitted to flow from one or more energy transfer interfaces of the train to one or more energy transfer interfaces of the energy consumption facility. The energy transmitted at step 710 can be AC electrical energy. Optionally, the energy transmitted at step 710 is DC electrical energy.

Transmitting energy at step 710 can include flowing energy from each rail car of the train. Optionally, only certain rail cars will have an energy transfer interface and transmitting energy at step 710 can include flowing energy from only the rail cars of the train that have an energy transfer interface. Optionally, the rail cars of the train can be electrically connected to one another such that any rail car without an energy transfer interface transmits electrical energy to adjacent rail cars or to a rail car that has an energy transfer interface. In one or more examples, the batteries of the rail cars of the train are discharged simultaneously. The discharge time (e.g., the time required to discharge the rail cars of the train) can be a maximum of 4 hours, 5 hours, 6 hours, etc. In one or more examples, the discharge time may be more than 6 hours.

As discussed above with respect to FIG. 3, energy being transmitted from the batteries of the rail cars can flow to one or more controllers and an inverter subsystem before reaching the energy transfer interface of rail car or the energy transfer interface of an adjacent rail car.

Where the method 700 involves a contactless system, the energy transfer interfaces that transfer energy at step 710 can include, for example, inductive coils. Transmitting energy at step 710 can include driving the inductive coil(s) of the rail cars, which then excites the inductive coil(s) of the energy consumption facility to which the inductive coil(s) of the rail cars are aligned due to proper positioning of the rail cars. To produce the inductive coupling for wireless energy transfer, transmitting energy at step 710 using a wireless system includes converting the DC electrical energy stored in the batteries of the rail cars to AC for driving the inductive coil.

Where the method 700 involves a contact system such as a pantograph system, the energy transfer interfaces that transmit energy at step 710 can be pantographs. Transmitting energy at step 710 via pantographs can include energizing the pantographs of the rail cars and then flowing that energy to a conductive wire via contact between the conductive wire and the pantographs. The pantographs may only transfer AC electrical energy. Accordingly, transmitting energy at step 710 using a pantograph system requires converting the DC electrical energy stored in the batteries of the rail cars to AC before energizing the pantograph and transmitting the energy from the energized pantographs to conductive wire of the energy consumption facility.

Where the method 700 involves a third rail system, a crane system, or a retractable arm system configured to engage with a contact shoe, the energy transfer interfaces that transmit energy at step 710 can be contact shoes. Transmitting energy at step 710 via contact shoes can include flowing energy from the contact shoes to a live rail or a plate of the energy consumption facility via contact between the contact shoes and the live rail/plate. The contact shoe system can transfer AC electrical energy and/or DC electrical energy. Where the energy consumption facility requires AC electrical energy, transmitting energy at step 710 can include converting the DC electrical energy stored in the batteries of the rail cars to AC before transmitting to the live rail of the energy consumption facility. Where the energy consumption facility requires DC electrical energy, transmitting energy at step 710 can include conditioning the DC electrical energy stored in the batteries of the rail cars (such as via an inverter subsystem) based on the energy requirements of the electrical loads of the energy consumption facility.

The energy transferred from the rail car(s) can be used to energize onsite electrical loads, distributed to a larger energy grid, etc. Once the batteries of the train are fully discharged, or once discharging completes (possibly when some batteries remain partially charged), the train can be relocated to an energy generation facility where the batteries can be recharged before again being relocated to the same or different energy consumption facility. Accordingly, the method 700 can be repeated to cyclically charge batteries of the train at energy generation facilities and discharge the batteries at energy consumption facilities.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. An energy delivery system for transporting electrical energy from an electrical energy generation facility to an electrical energy consumption facility via rail, the energy delivery system comprising:
   a train comprising at least one rail car loaded with at least one battery system, the at least one battery system comprising at least one energy transfer interface for receiving energy from the energy generation facility when the train is located at the energy generation facility for charging batteries of the at least one battery system and for transferring energy stored by the at least one battery system to the energy consumption facility when the train is located at the energy consumption facility;
   wherein the energy transfer interface is configured to receive energy from a corresponding energy transfer interface mounted to a crane system of the energy generation facility and to transfer energy to a corresponding energy transfer interface mounted to a crane system of the energy consumption facility.

2. The energy delivery system of claim 1, wherein the crane system of the energy generation facility comprises one or more sensors and a controller configured to:
   receive information from the one or more sensors corresponding to a position of the energy transfer interface of the at least one rail car; and
   align the energy transfer interface of the energy generation facility with the energy transfer interface of the at least one rail car via the crane system based on the received information.

3. The energy delivery system of claim 2, wherein the controller is configured to move the energy transfer interface of the energy generation facility vertically to align with the energy transfer interface of the at least one rail car.

4. The energy delivery system of claim 2, wherein the controller is configured to move the energy transfer interface of the energy generation facility horizontally to align with the energy transfer interface of the at least one rail car.

5. The energy delivery system of claim 2, wherein the controller is configured to:
   locate the energy transfer interface of a second rail car via the one or more sensors; and
   align the energy transfer interface of the energy generation facility with the energy transfer interface of the second rail car via the crane system.

6. The energy delivery system of claim 1, wherein the energy transfer interface of the at least one rail car is configured to receive energy from the corresponding energy transfer interface of the energy generation facility in a contactless manner.

7. The energy delivery system of claim 1, wherein the energy transfer interface of the at least one rail car includes at least one inductive coil.

8. The energy delivery system of claim 7, wherein the inductive coil is positioned to inductively couple with an inductive coil of the corresponding energy transfer interface of the energy generation facility to transfer energy in a contactless manner.

9. The energy delivery system of claim 1, wherein the energy transfer interface of the at least one rail car is configured to receive energy upon contacting the corresponding energy transfer interface of the energy generation facility.

10. The energy delivery system of claim 1, wherein the energy transfer interface of the at least one rail car includes a contact shoe.

11. The energy delivery system of claim 10, wherein the contact shoe is positioned to contact a contact plate of the corresponding energy transfer interface of the energy generation facility to transfer energy.

12. The energy delivery system of claim 1, wherein at least one rail car of the train comprises a well car loaded with one or more intermodal containers that house the batteries.

13. The energy delivery system of claim 12, wherein the at least one well car comprises a first intermodal container stacked on top of a second intermodal container.

14. The energy delivery system of claim 1, wherein a battery system of a first rail car is electrically connected to a battery system of a second rail car such that energy can be transmitted between the two rail cars.

15. The energy delivery system of claim 14, wherein the first rail car does not have an energy transfer interface.

16. The energy delivery system of claim 1, wherein one or more of the rail cars comprises a controller that controls energy flow to and/or from the rail car.

17. A method for transporting electrical energy from an electrical energy generation facility to an electrical energy consumption facility via rail, the method comprising:
   positioning a train comprising at least one rail car loaded with at least one battery system and at least one energy transfer interface proximate to an energy generation facility;
   aligning an energy transfer interface of the energy generation facility with the energy transfer interface of at least one rail car via a crane system of the energy generation facility;
   charging batteries of the at least one battery system with energy transferred from the energy generation facility to the at least one battery system via the energy transfer interfaces;
   relocating the train via one or more rail lines to an energy consumption facility that is remote from the energy generation facility;
   aligning an energy transfer interface of the energy consumption facility with the energy transfer interface of the at least one rail car via a crane system of the energy consumption facility; and
   transferring energy from the batteries of the at least one battery system to the energy consumption facility via the energy transfer interfaces.

18. The method of claim 17, wherein aligning the energy transfer interface of the energy generation facility with the energy transfer interface of the at least one rail car comprises:
- receiving information from one or more sensors of the crane system of the energy generation facility corresponding to a position of the energy transfer interface of the at least one rail car; and
- aligning the energy transfer interface of the energy generation facility with the energy transfer interface of the at least one rail car via a controller of the crane system based on the received information.

19. The method of claim 18, wherein aligning the energy transfer interface of the energy generation facility with the energy transfer interface of the at least one rail car comprises: moving the energy transfer interface of the energy generation facility vertically via the controller of the crane system.

20. The method of claim 18, wherein aligning the energy transfer interface of the energy generation facility with the energy transfer interface of the at least one rail car comprises: moving the energy transfer interface of the energy generation facility horizontally via the controller of the crane system.

21. The method of claim 18, comprising:
- locating the energy transfer interface of a second rail car via the one or more sensors of the crane system of the energy generation facility; and
- aligning the energy transfer interface of the energy generation facility with the energy transfer interface of the second rail car via the controller of the crane system.

22. The method of claim 17, wherein the energy transfer interface of the at least one rail car is configured receive energy from the corresponding energy transfer interface of the energy generation facility in a contactless manner.

23. The method of claim 17, wherein the energy transfer interface of the at least one rail car includes at least one inductive coil.

24. The method of claim 23, wherein aligning the energy transfer interface of the energy generation facility with the energy transfer interface of at least one rail car comprises positioning the inductive coil of the at least one rail car to inductively couple with an inductive coil of the corresponding energy transfer interface of the energy generation facility to transfer energy in a contactless manner.

25. The method of claim 24, wherein aligning the energy transfer interface of the energy generation facility with the energy transfer interface of at least one rail car comprises positioning the inductive coil of the at least one rail car within a predefined distance from the inductive coil of the corresponding energy transfer interface of the energy generation facility.

26. The method of claim 25, wherein the predefined distance is 5 mm, 20 mm, 100 mm, 300 mm, or 500 mm.

27. The method of claim 17, wherein the energy transfer interface of the at least one rail car is configured to receive energy upon contacting the corresponding energy transfer interface of the energy generation facility.

28. The method of claim 17, wherein the energy transfer interface of the at least one rail car includes a contact shoe.

29. The method of claim 17, wherein aligning the energy transfer interface of the energy generation facility with the energy transfer interface of at least one rail car comprises positioning the contact of the at least one rail car to contact a contact plate of the corresponding energy transfer interface of the energy generation facility to transfer energy.

30. The method of claim 17, comprising: relocating the train at the energy generation facility after the batteries have been at least partially discharged.

31. The method of claim 17, wherein a first battery system of a first rail car comprises the energy transfer interface and is electrically connected to a second battery system of a second rail car that does not have an energy transfer interface.

32. The method of claim 17, wherein at least one rail car of the train comprises a well car loaded with one or more intermodal containers that house the batteries.

33. The method of claim 32, wherein the at least one well car comprises a first intermodal container stacked on top of a second intermodal container.

34. The method of claim 17, wherein the train is moved via one or more locomotives that are powered independently of energy stored by the at least one battery system.

35. The method of claim 17, wherein the train is moved via one or more locomotives that are powered via energy stored by the at least one battery system.

* * * * *